US012633083B2

(12) United States Patent
Yuan et al.

(10) Patent No.: US 12,633,083 B2
(45) Date of Patent: May 19, 2026

(54) IMAGE PROCESSING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Zhiqiang Yuan, Shenzhen (CN); Yandong Yang, Shenzhen (CN); Wenyan Li, Shenzhen (CN); Rongxin Zhou, Shenzhen (CN); Lei Liu, Shenzhen (CN); Xinda Zhao, Shenzhen (CN); Zhipeng Gong, Shenzhen (CN); Hao Yang, Shenzhen (CN); Chen Cao, Shenzhen (CN); Wei Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 383 days.

(21) Appl. No.: 18/297,304

(22) Filed: Apr. 7, 2023

(65) Prior Publication Data

US 2023/0245420 A1     Aug. 3, 2023

Related U.S. Application Data

(63) Continuation of application No. PCT/CN2022/100817, filed on Jun. 23, 2022.

(30) Foreign Application Priority Data

Aug. 3, 2021   (CN) .......................... 202110888511.1

(51) Int. Cl.
   *G06V 10/54*     (2022.01)
   *G06V 10/24*     (2022.01)
(Continued)

(52) U.S. Cl.
   CPC .............. *G06V 10/54* (2022.01); *G06V 10/24* (2022.01); *H04N 19/176* (2014.11); *H04N 19/40* (2014.11)

(58) Field of Classification Search
None
See application file for complete search history.

(56) References Cited

U.S. PATENT DOCUMENTS

| | | | |
|---|---|---|---|
| 2011/0115806 A1 | 5/2011 | Rogers | |
| 2017/0201758 A1 | 7/2017 | Moguillansky et al. | |
| 2019/0304138 A1 | 10/2019 | Fuller et al. | |

FOREIGN PATENT DOCUMENTS

| | | |
|---|---|---|
| CN | 105761296 A | 7/2016 |
| CN | 111402380 A | 7/2020 |

(Continued)

OTHER PUBLICATIONS

Extended European Search Report issued Oct. 9, 2024 in European Application No. 22851749.6.

(Continued)

*Primary Examiner* — Vincent Rudolph
(74) *Attorney, Agent, or Firm* — Sughrue Mion, PLLC

(57) ABSTRACT

An image processing method and apparatus may be provided. The process may include, obtaining source compressed texture data of a target image by encoding the target image by using a source compressed texture format and determining a target compressed texture format adapted to the display card and a target compressed block size corresponding to the target compressed texture format. The process may also include obtaining a plurality of pieces of image texture data, based on decoding and aligning the source compressed texture data by using the target compressed block size, and obtaining target compressed texture data of the target image, based on transcoding each piece of the plurality of pieces of image texture data by using the (Continued)

target compressed texture format and the target compressed block size. The process may also include rendering the target image based on the target compressed texture data.

20 Claims, 15 Drawing Sheets

(51) Int. Cl.
 *H04N 19/176*      (2014.01)
 *H04N 19/40*      (2014.01)

(56)         References Cited

FOREIGN PATENT DOCUMENTS

CN      113034629  A      6/2021
CN      113327303  A      8/2021

OTHER PUBLICATIONS

Chinese Office Action for CN 202110888511.1, dated Sep. 9, 2021.
Written Opinion for PCT/CN2022/100817, dated Sep. 8, 2022.
International Search Report for PCT/CN2022/100817, dated Sep. 8, 2022.

Compressed texture data

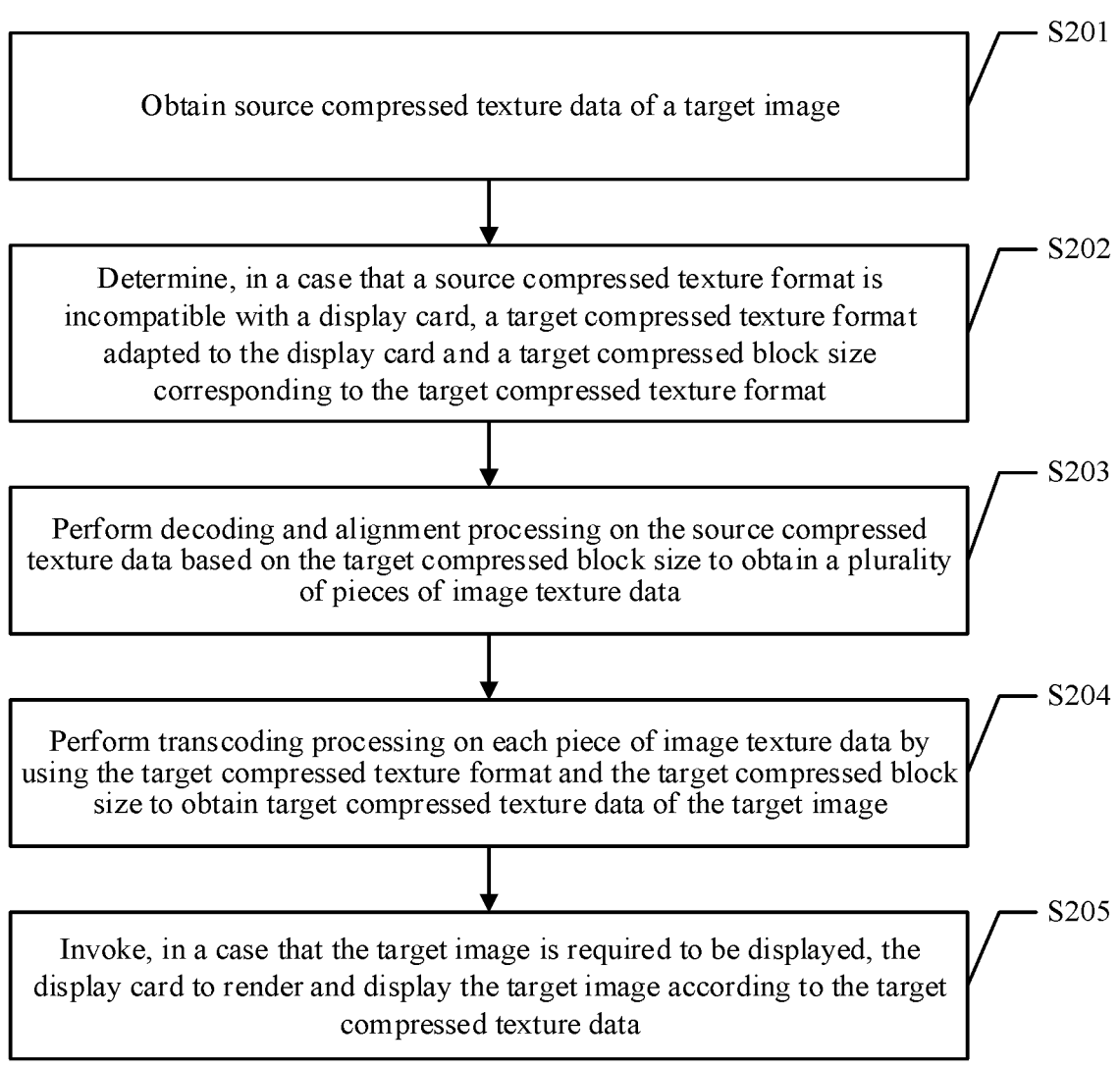

Obtain source compressed texture data of a target image — S201

Determine, in a case that a source compressed texture format is incompatible with a display card, a target compressed texture format adapted to the display card and a target compressed block size corresponding to the target compressed texture format — S202

Perform decoding and alignment processing on the source compressed texture data based on the target compressed block size to obtain a plurality of pieces of image texture data — S203

Perform transcoding processing on each piece of image texture data by using the target compressed texture format and the target compressed block size to obtain target compressed texture data of the target image — S204

Invoke, in a case that the target image is required to be displayed, the display card to render and display the target image according to the target compressed texture data — S205

FIG. 2

IMAGE PROCESSING METHOD AND APPARATUS, COMPUTER DEVICE, AND STORAGE MEDIUM

CROSS-REFERENCES TO RELATED APPLICATIONS

This application is a continuation of International Application No. PCT/CN2022/100817, filed on Jun. 23, 2022, which claims priority to Chinese Patent Application No. 202110888511.1, filed on Aug. 3, 2021, in the China National Intellectual Property Administration, the disclosures of which are incorporated herein by reference in their entireties.

FIELD

The present disclosure relates to the field of Internet technologies, particularly to the field of image processing technologies, and more particularly to an image processing method and apparatus, a computer device, a storage medium, and a computer-readable instruction product.

BACKGROUND

In related technologies, in a process of producing an image, to save an internal memory occupied by the image and a network resource required to transmit the image, an image producer usually performs compressed encoding on the image by using a source compressed texture format to obtain source compressed texture data of the image, thereby externally publishing the source compressed texture data. Accordingly, after obtaining the source compressed texture data of the image, if detecting that the source compressed texture format is incompatible with a display card, any external device usually directly decodes the source compressed texture data, and stores decoded texture data obtained by decoding, so as to facilitate subsequent rendering of the image according to the decoded texture data. In such an image processing manner, the problem of incompatibility between a data format of the source compressed texture data and the display card can be solved. However, an excessively large display memory is occupied, and running performance of the display card is affected.

SUMMARY

According to various embodiments of the present disclosure, an image processing method and apparatus, a computer device, a storage medium, and a computer-readable instruction product are provided.

An image processing method is provided. The method may be performed by at least one processor of a computer device, and the method may include obtaining source compressed texture data of a target image, by encoding the target image by using a source compressed texture format; determining, based on the source compressed texture format being incompatible with a display card of the computer device, a target compressed texture format adapted to the display card and a target compressed block size corresponding to the target compressed texture format; obtaining a plurality of pieces of image texture data, based on decoding and aligning the source compressed texture data by using the target compressed block size, a data size of each piece of the plurality of pieces of image texture data being an integer multiple of the target compressed block size; obtaining target compressed texture data of the target image, based on transcoding each piece of the plurality of pieces of image texture data by using the target compressed texture format and the target compressed block size, the target compressed texture data comprising one or more transcoded compressed texture blocks corresponding to each piece of the plurality of pieces of image texture data; and rendering the target image based on the target compressed texture data.

An image processing apparatus may be provided. The apparatus may include at least one memory configured to store computer program code; and at least one processor configured to access the computer program code and operate as instructed by the computer program code. The program code may include first obtaining code configured to cause the at least one processor to obtain source compressed texture data of a target image, by using a source compressed texture format; first determining code configured to cause the at least one processor to determine, based on the source compressed texture format being incompatible with a display card, a target compressed texture format adapted to the display card and a target compressed block size corresponding to the target compressed texture format; second obtaining code configured to cause the at least one processor to obtain a plurality of pieces of image texture data based on decoding and aligning the source compressed texture data by using the target compressed block size, a data size of each piece of the plurality of pieces of image texture data being an integer multiple of the target compressed block size; third obtaining code configured to cause the at least one processor to obtain target compressed texture data of the target image based on transcoding each piece of the plurality of pieces of image texture data by using the target compressed texture format and the target compressed block size, the target compressed texture data comprising one or more transcoded compressed texture blocks corresponding to each piece of the plurality of pieces of image texture data; and first rendering code configured to cause the at least one processor to render the target image based on the target compressed texture data.

A non-transitory computer-readable medium storing instructions may be provided. The instructions may include one or more instructions that, when executed by one or more processors of a device for image processing, cause the one or more processors to obtain source compressed texture data of a target image, by using a source compressed texture format; determine, based on the source compressed texture format being incompatible with a display card, a target compressed texture format adapted to the display card and a target compressed block size corresponding to the target compressed texture format; obtain a plurality of pieces of image texture data based on decoding and aligning the source compressed texture data by using the target compressed block size, a data size of each piece of the plurality of pieces of image texture data being an integer multiple of the target compressed block size; obtain target compressed texture data of the target image based on transcoding each piece of the plurality of pieces of image texture data by using the target compressed texture format and the target compressed block size, the target compressed texture data comprising one or more transcoded compressed texture blocks corresponding to each piece of the plurality of pieces of image texture data; and render the target image based on the target compressed texture data.

Details of one or more embodiments of the present disclosure will be described in the following drawings and descriptions. Other features, objectives, and advantages of the present disclosure will become apparent in the specification, the drawings, and the claims.

BRIEF DESCRIPTION OF THE DRAWINGS

In order to describe the technical solutions in the embodiments of the present disclosure more clearly, the drawings required to be used in descriptions about the embodiments will be simply described below. Apparently, the drawings in the descriptions below are merely some embodiments of the present disclosure. A person of ordinary skill in the art may further obtain other drawings according to these drawings without creative work.

FIG. 2 is a flowchart illustrating a process for image processing according to an embodiment of the present disclosure.

DETAILED DESCRIPTION

In order to make objectives, technical solutions, and advantages of the present disclosure clearer, the following further describes the present disclosure in detail with reference to the drawings and the embodiments. It is to be understood that specific embodiments described herein are only for explaining the present disclosure and not intended to limit the present disclosure.

Figure 1A:
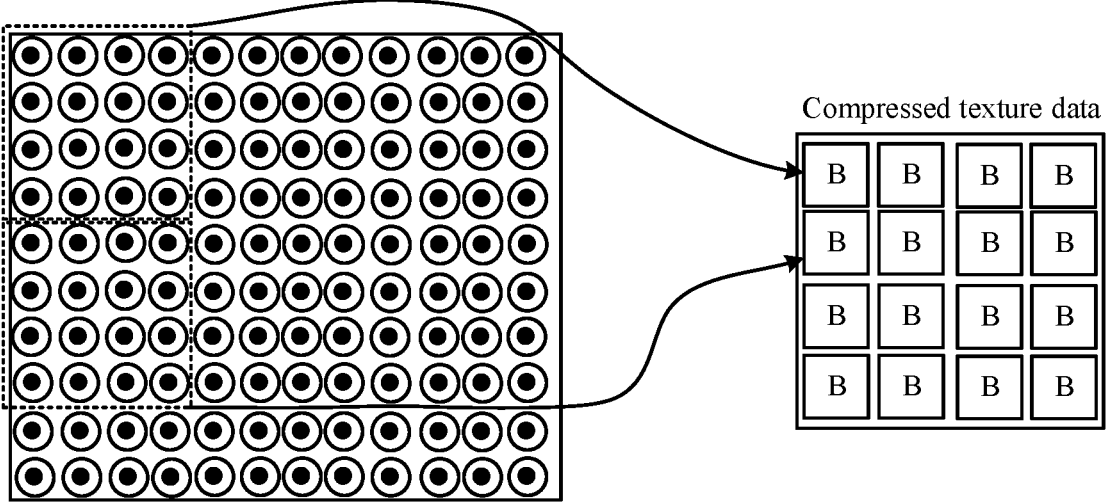
FIG. 1a is a schematic diagram of compressed encoding of pixels according to an embodiment of the present disclosure.

Based on an image processing technology in a computer vision technology, the embodiments of the present disclosure provide an image processing solution performed in a computer device. The image processing solution is mainly used to convert, when a data format (that is, a source compressed texture format) of source compressed texture data of a target image is incompatible with a display card in the computer device, the source compressed texture data into target compressed texture data of a target compressed texture format adapted to the display card, thereby avoiding the display card being occupied excessively and further improving running performance of the display card. The source compressed texture format is a compressed texture format used by an image producer in a process of producing the target image. The target compressed texture format is a compressed texture format adapted to the display card. A compressed texture format is a format in which pixel compression storage is performed on an image in units of compressed texture blocks (referred to as blocks for short). Any compressed texture format corresponds to one or more compressed block sizes. The compressed block size is mainly used for indicating a range of a quantity of compressed pixels in each block. For example, a compressed block size of 4×4 may be used for indicating the quantity of compressed pixels in each block is 4×4, that is, 4×4 may represent that four rows and four columns of pixels are compressed each time to obtain a block (denoted by B), as shown in FIG. 1a. It can be seen that the source compressed texture data obtained by encoding the target image by using the source compressed texture format may usually include a plurality of source compressed texture blocks. "A plurality of" mentioned in the embodiments of the present disclosure means at least two.

In a specific implementation, a general principle of the image processing solution is as follows. First, decoding and alignment processing may be performed on the source compressed texture data based on a compressed block size (referred to as a target compressed block size hereinafter) corresponding to the target compressed texture format to obtain a plurality of pieces of image texture data, a data size of each piece of image texture data being an integer multiple of the target compressed block size. Further, since the data size of each piece of image texture data is the integer multiple of the target compressed block size, each piece of image texture data may be transcoded into an integral quantity of compressed texture blocks (referred to as transcoded texture blocks hereinafter) of the target compressed texture format according to the target compressed block size. After one or more transcoded compressed texture blocks corresponding to each piece of image texture data are obtained, a transcoding process is ended, and the target compressed texture data of the target compressed texture format is obtained. The target compressed texture data includes the transcoded compressed texture block corresponding to each piece of image texture data.

Based on the related descriptions of the image processing solution, the following points need to be explained.

(1) A compressed block size (referred to as a source compressed block size hereinafter) corresponding to the data format (that is, the source compressed texture format) of the source compressed texture data may be the same as or different from the compressed block size (referred to as the target compressed block size hereinafter) corresponding to the target compressed texture format, which is not limited. For example, the source compressed block size may be 6×6, while the target compressed block size may be 4×4. For another example, both the source compressed block size and the target compressed block size may be 4×4.

Figure 1B:
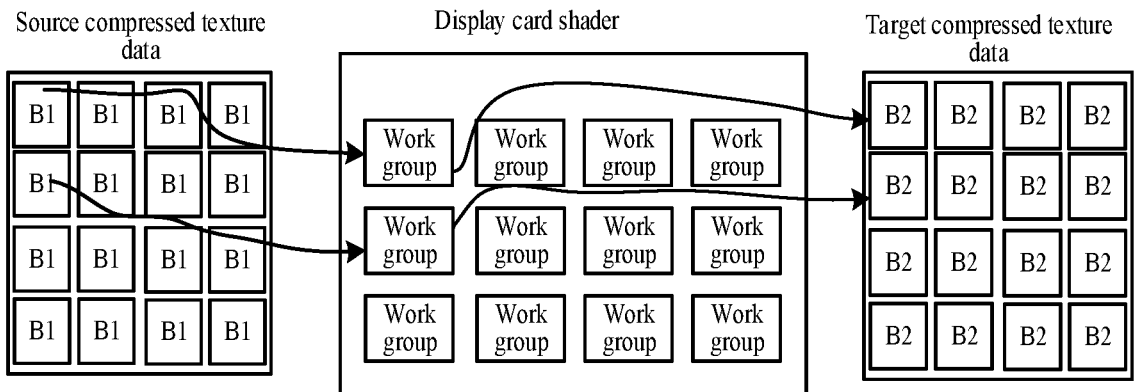
FIG. 1b is a schematic diagram of a correspondence between a source compressed texture block and a transcoded compressed texture block according to an embodiment of the present disclosure.
Figure 1C:
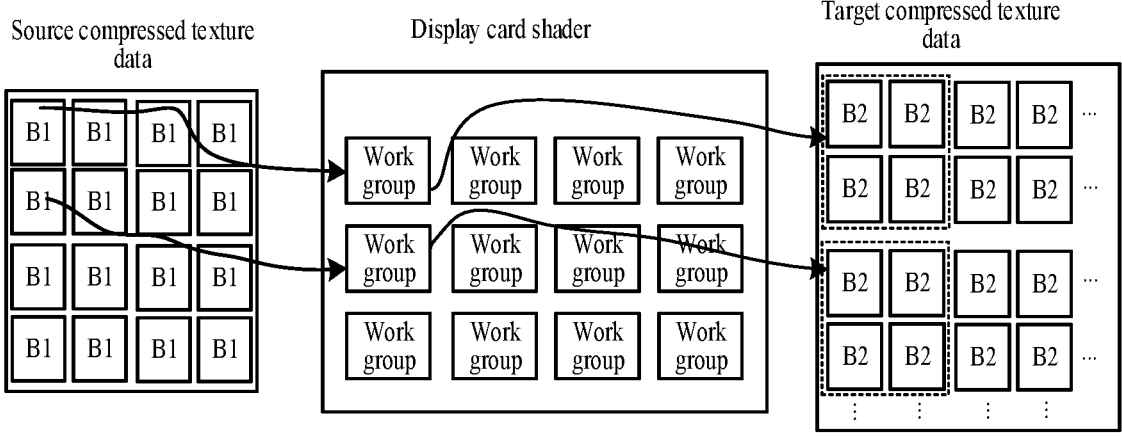
FIG. 1c is a schematic diagram of a correspondence between a source compressed texture block and a transcoded compressed texture block according to an embodiment of the present disclosure.

(2) When the source compressed block size is the same as the target compressed block size, one source compressed texture block (denoted by B1) in the source compressed texture data corresponds to one transcoded compressed texture block (denoted by B2) in the target compressed texture data, as shown in FIG. 1b. That is, when the source compressed block size is the same as the target compressed block size, a quantity of the source compressed texture blocks in the source compressed texture data is the same as that of the transcoded compressed texture blocks in the target compressed texture data. When the source compressed block size is different from the target compressed block size, one source compressed texture block in the source compressed texture data may correspond to a plurality of transcoded compressed texture blocks in the target compressed texture data. For example, if the source compressed block size is 8×8, and the target compressed block size is 4×4, one source compressed texture blocks may correspond to four transcoded compressed texture blocks, as shown in FIG. 1c. Alternatively, a plurality of source compressed texture blocks may correspond to one transcoded compressed texture block. For example, if the source compressed block size is 4×4, and the target compressed block size is 8×8, four source compressed texture blocks may correspond to one transcoded compressed texture block. Alternatively, E source compressed texture blocks may correspond to F transcoded compressed texture blocks, both E and F being integers greater than 1. For example, if the source compressed block size is 6×6, and the target compressed block size is 4×4, four source compressed texture blocks may correspond to nine transcoded compressed texture blocks. That is, when the source compressed block size is different from the target compressed block size, a quantity of the source compressed texture blocks in the source compressed texture data is different from that of the transcoded compressed texture blocks in the target compressed texture data.

(3) The above-mentioned computer device may be a terminal or a server, which is not limited. The terminal mentioned herein may include but is not limited to a smartphone, a tablet computer, a notebook computer, a desktop computer, a smartwatch, a smart television, or the like. Various applications (APPs) may run in the terminal, for example, a game APP, a multimedia APP, or a social APP. The server mentioned herein may be an independent physical server, or a server cluster or distributed system including a plurality of physical servers, or a cloud server providing a basic cloud computing service such as a cloud service, a cloud database, cloud computing, a cloud function, cloud storage, a network service, cloud communication, a middleware service, a domain name service, a security service, a content delivery network (CDN), and a big data and artificial intelligence platform.

Further, the display card in the computer device is a graphics processing unit (GPU)-centered device configured to perform a task of outputting and displaying an image. In order to improve decoding and alignment processing efficiency, the display card in the embodiments of the present disclosure may include at least a GPU, a rendering pipeline, a compute shader decoding pipeline (referred to as a decoding pipeline hereinafter), a display card compute shader (referred to as a display card shader hereinafter), and the like. (1) The rendering pipeline, also referred to as a rendering line, is a parallel processing unit that processes graphics signals separately in the display card, and may be configured to render an image. (2) The decoding pipeline is a processing unit configured to indicate a processing process of the display card shader, that, the display card shader in the embodiments of the present disclosure works according to the process specified by the decoding pipeline. (3) The display card shader is a processing unit running in the display card, and may include M work groups. The work group may be understood as a processing subunit with a decoding processing capability and a transcoding processing capability in the display card shader. The work groups are independent of each other. M is an integer greater than 1. The display card shader may be connected to an input display card shader cache block for data input and an output display card shader cache block for data output. When the foregoing image processing solution is performed in the computer device, a decoding operation and a transcoding operation on related data may be performed mainly by using the work groups in the display card shader, specifically referring to related descriptions in the following method embodiment.

In addition, the computer device may be located outside a blockchain network or inside the blockchain network, which is not limited. The blockchain network is a network including a peer-to-peer (P2P) network and a blockchain. The blockchain is a novel application mode of a computer technology such as distributed data storage, P2P transmission, a consensus mechanism, or an encryption algorithm, and is essentially a decentralized database, a string of data blocks (or referred to as blocks) generated associatively by using a cryptographic method. When the computer device is located inside the blockchain network, or is in communication connection to the blockchain network, the computer device may upload internal data to the blockchain of the blockchain network for storage, so as to prevent the internal data of the computer device from being tampered and further improving security of the internal data.

Practice shows that the image processing solution mentioned in the embodiments of the present disclosure may have at least the following beneficial effects. (1) Decoding and alignment processing may make the data size of each piece of image texture data the integer multiple of the target compressed block size. Then, each piece of image texture data may be conveniently transcoded into one or more transcoded compressed texture blocks for storage by using the target compressed texture format and the target compressed block size. Therefore, an occupied display memory can be effectively reduced, and running performance of the display card can be improved. (2) Data loaded from a storage space is the target compressed texture data when the target image is required to be displayed. Compared with loading decoded data, this manner has the advantage that a data volume of the target compressed texture data is smaller, so that a problem of excessive bus bandwidth occupation during data loading can be solved, image rendering efficiency can be improved, and image display timeliness can be further improved. (3) A data format of each transcoded compressed texture block is adapted to the display card, so that when the display card is invoked to render the target image according to each transcoded compressed texture block, the image rendering efficiency is further effectively improved, and the image display timeliness is further improved.

An embodiment of the present disclosure provides an image processing method. The image processing method may be performed in the above-mentioned computer device.

Referring to FIG. 2, the image processing method may include the following operations S201 to S205:

S201: Obtain source compressed texture data of a target image.

The target image may be any image, for example, a game picture in a target game, a video image in any movie and television drama, a selfie image of any user, or a scenery image of any scenic spot. The target game mentioned herein may be any normal game, or any cloud game. The normal game is a game run directly in a game client installed in a terminal device used by a player. The cloud game may also be referred to as gaming on demand, a game mode based on cloud computing. Cloud computing herein is an Internet-based compute mode. In a cloud game scene, the game is run not in the game client of the player but in a cloud game server. The cloud game server encodes a game picture involved in the game scene into a video stream, and transmits the video stream to the game client of the player through a network for playing. Further, a data format of the target image may be a texture format. The texture format mentioned herein may be, for example, a red, green, blue and alpha (RGBA) format. In RGBA. R represents a red channel, G represents a green channel, B represents a blue channel, and A represents a transparent channel.

The source compressed texture data of the target image is obtained by encoding the target image by using a source compressed texture format. A process of encoding the target image by using the source compressed texture format may be understood as a process of converting the data format of the target image from the texture format to the source compressed texture format. The source compressed texture data obtained by encoding may include a plurality of source compressed texture blocks. The source compressed texture block is a compressed texture block obtained by performing compressed encoding on the target image by using the source compressed texture format. The source compressed texture format may be an adaptive scalable texture compression (ASTC) format, an Ericsson texture compression (ETC) format, or the like. A compressed block size corresponding to the source compressed texture format may be referred to as a source compressed block size. The source compressed block size may be A×B. A×B represents that A rows and B columns of pixels are compressed into a block. Both A and B are integers greater than 1. For example, when the source compressed texture format is ASTC or ETC, since source compressed block sizes corresponding to ASTC and ETC may range from 4×4 to 12×12, the source compressed block size may be 4×4, 6×6, 8×8, or 12×12. Taking 4×4 as an example, 4×4 may represent that four rows and four columns of pixels are compressed into a block.

In a specific implementation, if the source compressed texture data of the target image is not pre-stored in a local space of the computer device, a specific implementation of operation S201 may be sending a data obtaining request to another device that stores the source compressed texture data, to request the another device to return the source compressed texture data, and then receiving, by the computer device, the source compressed texture data. If the source compressed texture data of the target image is pre-stored in a local space of the computer device, the computer device may load the source compressed texture data from the local space through the internal rendering pipeline, to obtain the source compressed texture data. That is, a specific implementation of operation S201 may be that the rendering pipeline loads the source compressed texture data of the target image from the local space of the computer device.

S202: Determine, when the source compressed texture format is incompatible with the display card, a target compressed texture format adapted to the display card and a target compressed block size corresponding to the target compressed texture format.

That the source compressed texture format is incompatible with the display card means that the display card does not support image rendering on any piece of data of the source compressed texture format. In the case that the source compressed texture format is incompatible with the display card, the computer device may determine the target compressed texture format adapted to the display card. The target compressed texture format may be any compressed texture format adapted to (or compatible with) the display card, for example, a DXT5 (a lossy texture compression algorithm) format. The target compressed block size is a compressed block size corresponding to the target compressed texture format. The target compressed block size may be X×Y. X×Y represents that X rows and Y columns of pixels into a block. X and Y are integers greater than 1. For example, the target compressed texture format is the DXT5 format, and both X and Y may be 4. In this case, the target compressed block size may be 4×4.

S203: Perform decoding and alignment processing on the source compressed texture data based on the target compressed block size to obtain a plurality of pieces of image texture data.

A size of each source compressed texture block in the source compressed texture data is the source compressed block size corresponding to the source compressed texture format, but a size of a compressed texture block finally obtained by transcoding is the target compressed block size. Therefore, only when the source compressed block size is an integer multiple of the target compressed block size, the display card shader may be directly invoked to decode and transcode each source compressed texture block into one or more compressed texture blocks of the target compressed block size, otherwise transcoding fails. For example, if the target compressed block size is set to 4×4, for a source compressed texture block of the source compressed block size of 4×4, 8×8, or 12×12, the display card shader may be directly invoked to decode and transcode each source compressed texture block into one, four, or nine 4×4 compressed texture blocks. However, for a source compressed texture block of the source compressed block size of 6×6, the display card shader may not be directly invoked to transcode the source compressed texture block into a plurality of compressed texture blocks of the target compressed block size. Based on this, for case of subsequent transcoding processing, the computer device may first perform decoding and alignment processing on the source compressed texture data based on the target compressed block size, such that a data size of each piece of image texture data obtained by processing is the integer multiple of the target compressed block size. This facilitates transcoding, in the display card shader, of each piece of image texture data into one or more compressed texture blocks of the target compressed block size.

The image texture data is texture data on which compressed encoding is not performed. That is, a data format of the image texture data is the texture format. The data size of the image texture data is used for indicating a quantity of pixels in the image texture data. For example, if the data size of the image texture data is 128×128, the data size represents that the image texture data includes 128×128 pixels. Thus, it can be seen that both the data size of the image texture data and the target compressed block size (X×Y) include two values. Therefore, that the data size is equal to the integer multiple of the target compressed block size means that the first value of the data size is an integer multiple of the first value (that is, a value of X) of the target compressed block size, and the second value of the data size is an integer multiple of the second value (that is, a value of Y) of the target compressed block size. For example, the target compressed block size is set to 4×4. If the data size is 8×8, the first value (value 8) of the data size is twice the first value (value 4) of the target compressed block size, and the second value (value 8) of the data size is also twice the second value (value 4) of the target compressed block size, so that the data size 8×8 is an integer multiple of the target compressed block size. If the data size is 8×10, the first value (value 8) of the data size is twice the first value (value 4) of the target compressed block size, and the second value (value 10) of the data size is 2.5 times the second value (value 4) of the target compressed block size, so that the data size 8×10 is not an integer multiple of the target compressed block size.

In a specific implementation, decoding and alignment processing may include processing of first data decoding and then data alignment. Processing of first data decoding and then data alignment is processing of first decoding the source compressed texture data into decoded texture data of the texture format, and then aligning the decoded texture data into the plurality of pieces of image texture data. Accordingly, in this specific implementation, a specific implementation of operation S203 may include the following operations s11 to s12:

s11: Perform decoding processing on the source compressed texture data to obtain the decoded texture data of the target image, the decoded texture data including P rows and Q columns of pixels, and P and Q being integers greater than 1.

Specifically, a target work group for decoding may be allocated, in the display card shader, to each source compressed texture block in the source compressed texture data, and each source compressed texture block is distributed to the corresponding target work group. Each target work group in the display card shader is invoked in parallel to perform decoding processing on the corresponding compressed texture block to obtain the decoded texture data of the target image.

s12: Align the P rows and Q columns of pixels into a plurality of groups of pixels according to the target compressed block size, each group of pixels including X rows and Y columns of pixels, and decoded texture data of one group of pixels forming corresponding image texture data.

In an implementation, when aligning the P rows and Q columns of pixels into the plurality of groups of pixels according to the target compressed block size, the computer device may first determine, in units of every X rows, X rows of current to-be-aligned pixels based on remaining rows of pixels on which alignment processing is not performed in the P rows of pixels. Specifically, when a row quantity of the remaining rows of pixels on which alignment processing is not performed in the P rows of pixels is greater than or equal to X, the X rows of current to-be-aligned pixels may be selected from the remaining rows of pixels according to a selection sequence from top to bottom; or when a row quantity of the remaining rows of pixels on which alignment processing is not performed in the P rows of pixels is less than X, the remaining rows of pixels may be padded with J rows of invalid pixels to obtain X rows of pixels, and the X rows of pixels obtained by padding are determined as the X rows of current to-be-aligned pixels, a value of J being equal to a difference between X and the row quantity of the remaining rows of pixels. For example, P is 11, and X is 4. In this case, the computer device may select the first to fourth rows of pixels as four rows of current to-be-aligned pixels at the first time, and select the fifth to eighth rows of pixels as four rows of current to-be-aligned pixels at the second time. At the third time, a row quantity of the remaining rows of pixels on which alignment processing is not performed is three, less than X, so that the three remaining rows of pixels may be padded with one row of invalid pixels to obtain four rows of pixels, and the four rows of pixels obtained by padding are determined as four rows of current to-be-aligned pixels. It can be seen that when the row quantity of the remaining rows of pixels is less than X, pixel padding is performed by using the J rows of invalid pixels, such that the remaining rows of pixels after padding may satisfy in width a pixel quantity required by subsequent transcoding. Therefore, the remaining rows of pixels may be successfully transcoded into the compressed texture blocks of the target compressed texture format and prevented from being discarded, and accuracy of a transcoding result can be effectively improved. The above-mentioned invalid pixel is a pixel whose pixel value is a specified value. The specified value may be set according to an empirical value or a service requirement. For example, the specified value may be 0 or 255.

After determining the X rows of current to-be-aligned pixels, the computer device may perform alignment processing on the X rows of current to-be-aligned pixels according to an alignment frequency of one alignment for every Y column, to obtain N groups of pixels, N being a positive integer, and one group of pixels including X rows and Y columns of pixels. When there are K remaining columns of pixels in the X rows of current to-be-aligned pixels after alignment processing is performed on the X rows of current to-be-aligned pixels, $1 \leq K < Y$, the K columns of pixels may be padded with Y-K columns of invalid pixels to obtain a group of pixels. For example, both X and Y are 4, and there are totally 11 columns of pixels in the four rows of current to-be-aligned pixels. In this case, the computer device may align the first to fourth columns in the four rows of current to-be-aligned pixels into a group of pixels, and align the fifth to eighth columns into a group of pixels, with three columns of pixels remaining. In this case, the remaining three columns of pixels may be padded with one column of invalid pixels to obtain a group of pixels. It can be seen that pixel padding is performed by using the Y-K columns of invalid pixels, such that the K columns of pixels after padding may satisfy in length a pixel quantity required by subsequent transcoding. Therefore, the K columns of pixels may be successfully transcoded into the compressed texture blocks of the target compressed texture format and prevented from being discarded, and accuracy of a transcoding result can be effectively improved.

In another implementation, when aligning the P rows and Q columns of pixels into the plurality of groups of pixels according to the target compressed block size, the computer device may first determine, in units of every Y rows, Y columns of current to-be-aligned pixels based on remaining columns of pixels on which alignment processing is not performed in the Q columns of pixels. Specifically, when a column quantity of the remaining columns of pixels on which alignment processing is not performed in the Q columns of pixels is greater than or equal to Y, the Y columns of current to-be-aligned pixels may be selected from the remaining columns of pixels according to a selection sequence from left to right; or when a column quantity of the remaining columns of pixels on which alignment processing is not performed in the Q columns of pixels is less than Y, the remaining columns of pixels may be padded with F columns of invalid pixels to obtain Y columns of pixels, and the Y columns of pixels obtained by padding are determined as the Y columns of current to-be-aligned pixels, a value of F being equal to a difference between Y and the column quantity of the remaining columns of pixels. After determining the Y columns of current to-be-aligned pixels, the computer device may perform alignment processing on the Y columns of current to-be-aligned pixels according to an alignment frequency of one alignment for every X rows, to obtain L groups of pixels, L being a positive integer, and one group of pixels including X rows and Y columns of pixels. When there are C remaining rows of pixels in the Y columns of current to-be-aligned pixels after alignment processing is performed on the Y columns of current to-be-aligned pixels, $1 \leq C < X$, the C rows of pixels may be padded with X-C rows of invalid pixels to obtain a group of pixels.

In another specific implementation, decoding and alignment processing may include processing of first data alignment and then data decoding. Processing of first data alignment and then data decoding is processing of first dividing the plurality of source compressed texture blocks in the source compressed texture data into a plurality of texture block groups according to a data alignment factor, and then decoding each texture block group into image texture data. Accordingly, in this specific implementation, a specific implementation of operation S203 may include the following operations s21 to s23:

s21: Calculate the data alignment factor according to the target compressed block size and the source compressed block size.

The data alignment factor indicates a quantity of source compressed texture blocks required to obtain one piece of image texture data by decoding. For example, if the data alignment factor is 2, it indicates that two source compressed texture blocks are required to obtain one piece of image texture data by decoding. It can be seen from the above that the source compressed block size is A×B, and the target compressed block size is X×Y. Based on this, when performing operation s21, the computer device may calculate a minimum common multiple between A and X as a first minimum common multiple, and determine a ratio of the first minimum common multiple to A as a row alignment factor. In addition, the computer device may further calculate a minimum common multiple between B and Y as a second minimum common multiple, and determine a ratio of the second minimum common multiple to B as a column alignment factor. After determining the row alignment factor and the column alignment factor, a multiplication operation may be performed on the row alignment factor and the column alignment factor to obtain the data alignment factor. The minimum common multiple is a smallest common multiple in all common multiples between two or more values. The common multiple is a multiple of each of two or more values. For example, for two values 4 and 6, multiples of the value 4 include 4, 8, 12, 16, 20, 24, . . . , and multiples of the value 6 include 6, 12, 18, 24, 30, . . . . Therefore, 12, 24, and the like are common multiples of the value 4 and the value 6, and a minimum common multiple is 12. Further, a calculation manner for the data alignment factor is described with an example. It is set that the source compressed block size is 6×6, and the target compressed block size is 4×4. In this case, it may be obtained by calculation that both the first minimum common multiple and the second minimum common multiple are 12. Further, it may be obtained by calculation that the row alignment factor is $12 \div 6 = 2$, and the column alignment factor is $12 \div 6 = 2$. Furthermore, it may be obtained by calculation that the data alignment factor is $2 \times 2 = 4$.

In some embodiments, when performing operation s21, the computer device may directly perform the operation of calculating a minimum common multiple between A and X as a first minimum common multiple. Alternatively, whether the target compressed block size is the same as the source compressed block size may be detected first. If the target compressed block size is the same as the source compressed block size, it indicates that a data size of decoded data obtained by decoding one source compressed texture block is necessarily an integer multiple of the target compressed block size; or if the target compressed block size is different from the source compressed block size, it indicates that a data size of decoded data obtained by decoding one source compressed texture block may or may not be an integer multiple of the target compressed block size. Based on this, if the target compressed block size is equal to the source compressed block size, the computer device may determine a unit value (for example, a value 1) as the data alignment factor; or if the target compressed block size is not equal to the source compressed block size, the operation of calculating a minimum common multiple between A and X as a first minimum common multiple is performed. With such a processing logic, when the target compressed block size is equal to the source compressed block size, calculation operations for the minimum common multiples and the like can be avoided, and processing resources can be saved.

s22: Divide the plurality of source compressed texture blocks into the plurality of texture block groups according to the data alignment factor, a quantity of source compressed texture blocks in one texture block group being consistent with the quantity indicated by the data alignment factor.

Figure 3A:
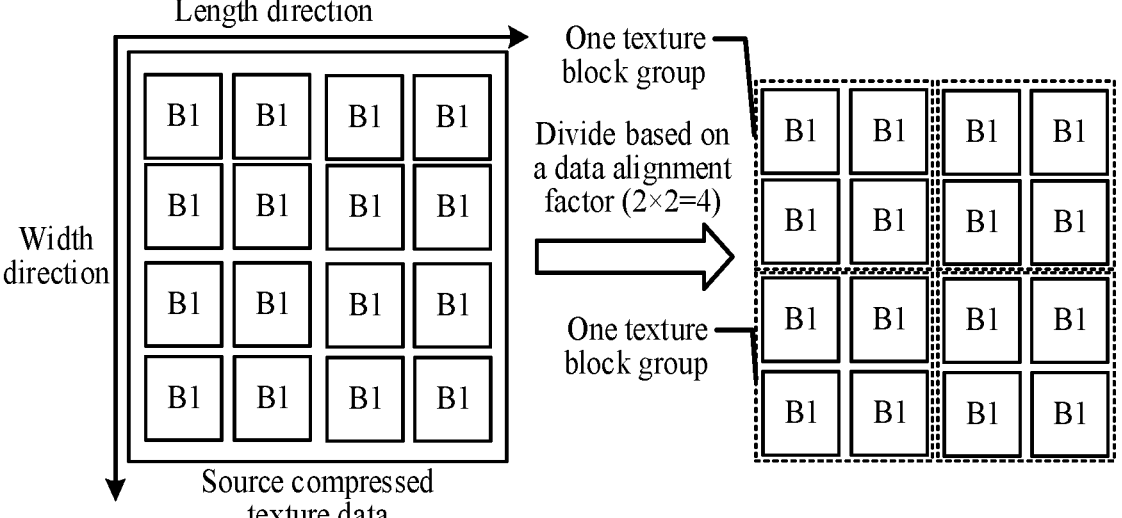
FIG. 3a is a schematic diagram of dividing a plurality of source compressed texture blocks into a plurality of texture block groups according to a data alignment factor according to an embodiment of the present disclosure.

In a specific division process, the plurality of source compressed texture blocks are divided into the plurality of texture block groups in length and width directions respectively based on the column alignment factor and the row alignment factor that the data alignment factor involves. For example, in the an example, it is set that the data alignment factor is 4 (that is, 2×2). In this case, the computer device may sequentially select two source compressed texture blocks in each of the length direction and the width direction to form a texture block group, as shown in FIG. 3a. Further, if a quantity of source compressed texture blocks in the length direction (that is, a column quantity of the source compressed texture data) is not an integer multiple of the column alignment factor, padding processing may be performed on the source compressed texture data in the length direction by using one or more columns of invalid source compressed texture blocks, such that a column quantity of the source compressed texture data after padding is the integer multiple of the column alignment factor. Similarly, if a quantity of source compressed texture blocks in the width direction (that is, a row quantity of the source compressed texture data) is not an integer multiple of the row alignment factor, padding processing may be performed on the source compressed texture data in the width direction by using one or more rows of invalid source compressed texture blocks, such that a row quantity of the source compressed texture data after padding is the integer multiple of the row alignment factor. The invalid source compressed texture block is a source compressed texture block obtained by compression encoding on A×B invalid pixels (for example, pixels whose pixel values are 0) by using the source compressed texture format.

Figure 3B:
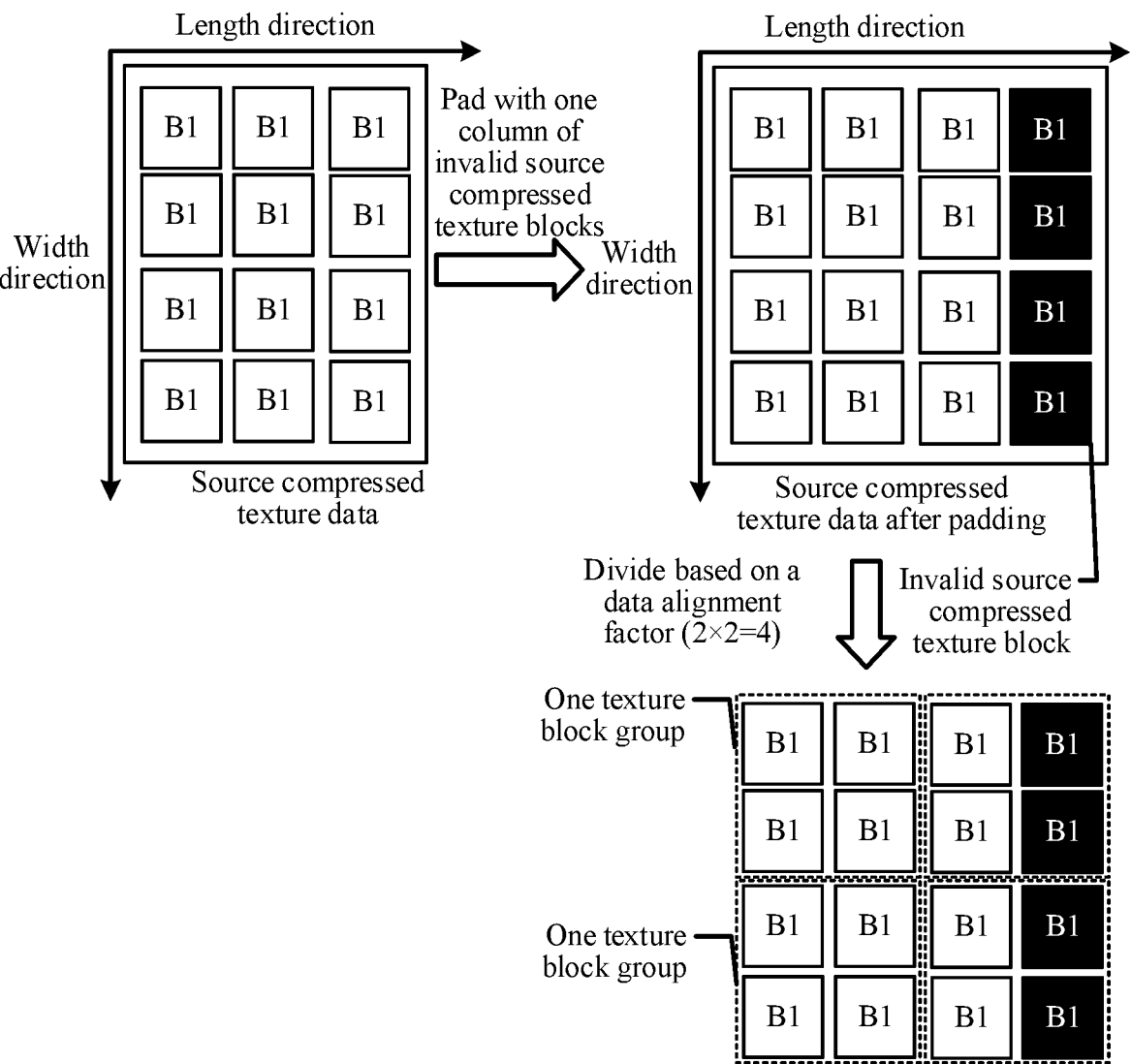
FIG. 3b is a schematic diagram of dividing a plurality of source compressed texture blocks into a plurality of texture block groups according to a data alignment factor according to an embodiment of the present disclosure.

For example, both the column alignment factor and the row alignment factor are set to 2, and then the data alignment factor is 4. Then, the source compressed texture data is set to include three columns of source compressed texture blocks in the length direction and include four rows of source compressed texture blocks in the width direction. The column quantity of the source compressed texture data is 3, not an integer multiple of the column alignment factor, and the row quantity of the source compressed texture data is 4, an integer multiple of the row alignment factor. Therefore, the computer device may perform padding processing on the source compressed texture data in only the length direction by using one column of invalid source compressed texture blocks to make the source compressed texture data after padding include four columns of source compressed texture blocks (that is, the three columns of original source compressed texture blocks and the one column of invalid source compressed texture blocks). Then, the source compressed texture data after padding is divided into the plurality of texture block groups according to the data alignment factor, one texture block group including four source compressed texture blocks, as shown in FIG. 3b.

s23: Perform decoding processing on each texture block group to obtain the plurality of pieces of image texture data, one texture block group corresponding to one piece of image texture data.

Specifically, the computer device may allocate, in the display card shader, a processing work group to each texture block group, each processing work group having at least a decoding capability, and then distribute each texture block group to the corresponding processing work group. Then, each processing work group may be invoked in parallel to perform decoding processing on each source compressed texture block in the corresponding texture block group to obtain the plurality of pieces of image texture data. Parallel decoding is used, so that decoding efficiency can be effectively improved, and time for an entire image processing process can be shortened. Certainly, it is to be understood that in another embodiment, decoding processing may be sequentially performed on each texture block by one processing work group in the display card shader to obtain the plurality of pieces of image texture data. This is not limited.

S204: Perform transcoding processing on each piece of image texture data by using the target compressed texture format and the target compressed block size to obtain target compressed texture data of the target image.

The target compressed texture data includes one or more transcoded compressed texture blocks corresponding to each piece of image texture data. The transcoded compressed texture block is a compressed texture block obtained by transcoding each piece of image texture data, whose data format is the target compressed texture format and whose size is the target compressed block size.

In an implementation, if the computer device obtains the image texture data by processing of first data decoding and then data alignment when performing operation S203, after performing a data decoding operation through the display card shader, the computer device controls the display card shader to output the decoded texture data, thereby performing a data alignment operation on the decoded texture data. Therefore, after obtaining the plurality of pieces of image texture data by data alignment, the computer device may input the plurality of pieces of image texture data to the display card shader again for transcoding processing. Based on this, when performing operation S204, the computer device may allocate, in the display card shader, a plurality of transcoding work groups for transcoding to the plurality of pieces of image texture data, one transcoding work group being allocated to one or more pieces of image texture data, and distribute each piece of image texture data to a corresponding transcoding work group. Then, each transcoding work group is invoked in parallel to perform transcoding processing on the corresponding image texture data according to the target compressed texture format and the target compressed block size to obtain the target compressed texture data of the target image.

In another implementation, if the computer device obtains the image texture data by processing of first data alignment and then data decoding when performing operation S203, the computer device first divides the plurality of source compressed texture blocks into the plurality of texture block groups by using a data alignment operation, and then inputs the plurality of texture block groups to the display card shader, and then the processing work groups in the display card shader perform data decoding operations on the corresponding texture block groups. Each processing work group further has a transcoding capability. Therefore, after obtaining corresponding image texture data by decoding, each processing work group in the display card shader may directly perform transcoding processing on the corresponding image texture data, and the plurality of pieces of image texture data obtained by decoding do not need to be output. Based on this, when performing operation S204, the computer device may continue to invoke, after any processing work group obtains a piece of image texture data by decoding, the any processing work group to perform transcoding processing on the corresponding image texture data by using the target compressed texture format and the target compressed block size. It can be seen that, in such a processing manner, the display card shader may be invoked once to implement data decoding and transcoding processing, thereby obtaining the target compressed texture data of the target compressed texture format. The display card shader is prevented from being invoked for many times, so that impact on performance of the display card shader can be effectively reduced, the running performance of the display card shader is improved, and a data processing effect is further improved.

S205: Invoke, when the target image is required to be displayed, the display card to render the target image according to the target compressed texture data.

In a specific implementation process, the target compressed texture data obtained by using operations S201 to S204 may be cached to a display memory. In this case, when performing operation S205, the computer device may invoke the display card to obtain the target compressed texture data from the display memory, then perform decoding processing on the target compressed texture data to obtain the target compressed texture data of the texture format, and finally invoke the rendering pipeline in the display card to render the target image according to the target compressed texture data of the texture format. In some embodiments, if padding processing with an invalid pixel or padding processing with an invalid compressed block is performed during implementation of operations S201 to S204, after the target compressed texture data is obtained by decoding, a to-be-filtered invalid pixel may further be determined in the target compressed texture data based on a padding position corresponding to padding processing, and the to-be-filtered invalid pixel is filtered from the target compressed texture data to obtain filtered target compressed texture data. Therefore, the rendering pipeline in the display card is invoked to render the target image according to the filtered target compressed texture data. The invalid pixel is filtered, so that the rendered target image is more real, and an image display effect is improved.

Figure 3C:
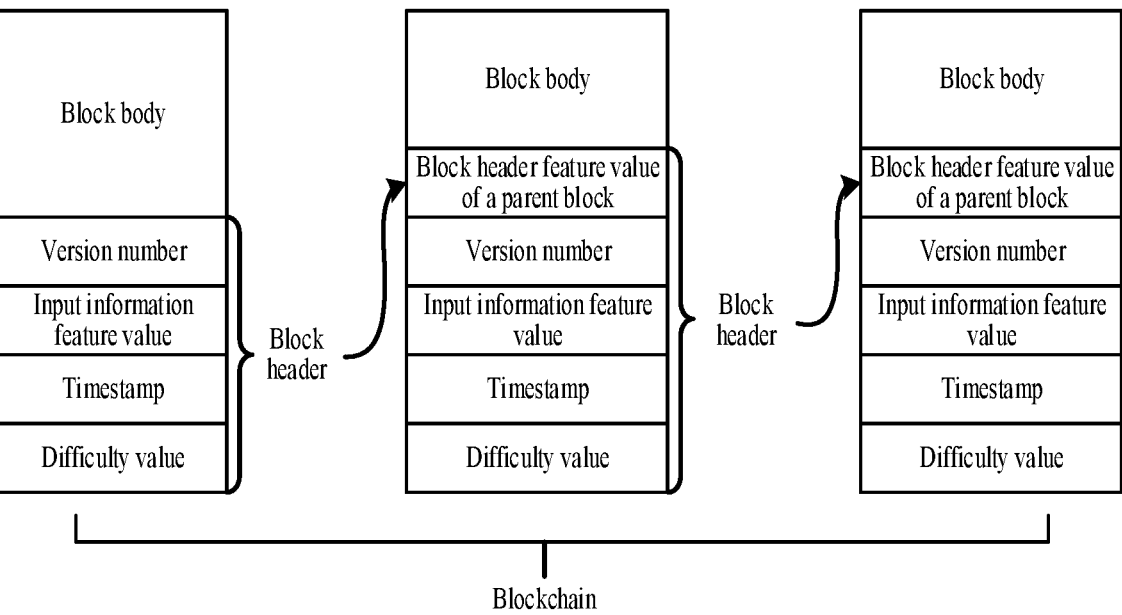
FIG. 3c is a schematic structural diagram of a block chain according to an embodiment of the present disclosure.

In some embodiments, after obtaining the target compressed texture data, the computer device may further upload the target compressed texture data to a blockchain, so as to prevent the target compressed texture data from being tampered. The blockchain includes a plurality of blocks, as shown in FIG. 3c. A genesis block includes a block header and a block body. The block header stores an input information feature value, a version number, a timestamp, and a difficulty value. The block body stores input information. The genesis block is a parent block of a next block of the genesis block. The next block also includes a block header and a block body. The block header stores an input information feature value of the current block, a block header feature value of the parent block, a version number, a timestamp, and a difficulty value. By parity of reasoning, block data stored in each block in the blockchain is associated with that stored in a parent block. This ensures security of input information in the block. Based on this, a specific implementation of uploading the target compressed texture data to the blockchain may be as follows.

Figure 3D:
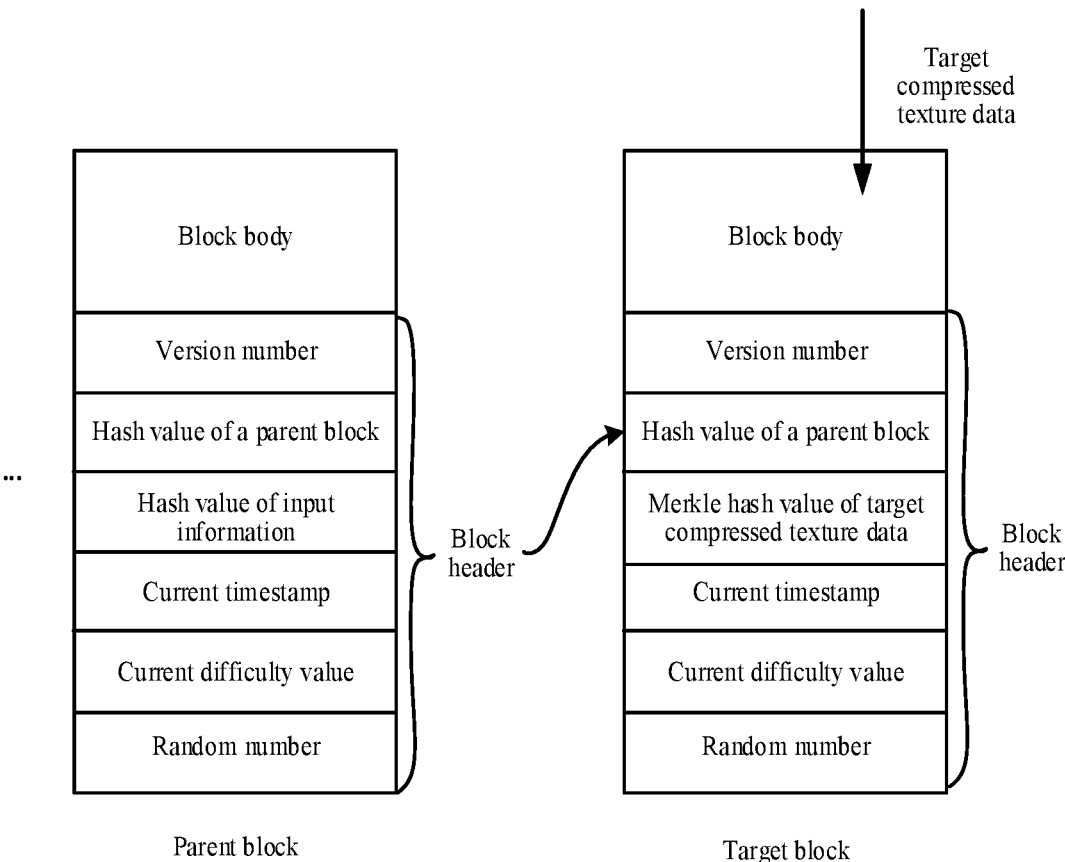
FIG. 3d is a schematic diagram of adding target compressed texture data to a block chain according to an embodiment of the present disclosure.

If the computer device is located inside a blockchain network, the target compressed texture data may be first added to a block body of a target block, and a hash operation is performed on the target compressed texture data in the block body to obtain a Merkle hash value. Then, a random number may be generated by using a random algorithm, and a block header of the target block is formed by the calculated Merkle hash value, the random number, a version number, a hash value of a previous block, a current timestamp, and a current difficulty value, as shown in FIG. 3d. The version number is version information of a related block protocol in the blockchain. The hash value of the previous block is a feature value of a block header of the previous block. The current timestamp is system time when the block header is formed. The current difficulty value is a difficulty value for calculation. The difficulty value is constant in a fixed time period, and is redetermined after the fixed time period. Then, one or more hash operations may be performed on the content in the block header by using a feature value algorithm (for example, an SHA256 algorithm) to obtain a feature value of the block header of the target block. A quantity of hash operations herein may be determined according to the difficulty value. The quantity of hash operations may be in positive correlation with the difficulty value. After the target block is obtained, the target block may be broadcast to each consensus node in the blockchain network for consensus processing. After consensus processing succeeds, the target block is added to the blockchain. It is to be understood that if the computer device is not located inside the blockchain network, the target compressed texture data may be sent to any consensus node in the blockchain network, and the any consensus node performs the foregoing operations to store the target compressed texture data to the blockchain.

In some embodiments, the computer device may perform cloud storage processing on the target compressed texture data by using a cloud technology. The cloud technology is a hosting technology of unifying a series of hardware, software, and network resources, and the like in a wide area network or a local area network to implement calculation, storage, processing, and sharing of data. The cloud technology is a generic term of a cloud computing commercial-mode application-based network technology, information technology, integration technology, management platform technology, application technology, and the like. A resource pool may be formed, and is flexibly and conveniently used on demand. A cloud computing technology will become an important support. Correspondingly, cloud storage is a novel concept extending and developing based on the concept of cloud computing. A distributed cloud storage system (referred to as a storage system hereinafter) is a storage system that integrates a number of different types of storage devices (the storage device is also referred to as a storage node) in the network through application software or application interfaces by using a function such as a cluster application, a grid technology, and a distributed storage file system to cooperate to externally provide data storage and service access functions.

In an embodiment of the present disclosure, after the source compressed texture data of the target image is obtained, decoding and alignment processing may be performed on the source compressed texture data based on the target compressed block size corresponding to the target compressed texture format adapted to the display card to obtain the plurality of pieces of image texture data. Decoding and alignment processing may make the data size of each piece of image texture data the integer multiple of the target compressed block size. Then, each piece of image texture data may be conveniently transcoded into one or more transcoded compressed texture blocks for storage by using the target compressed texture format and the target compressed block size. The transcoded compressed texture block obtained by transcoding is of a compressed texture format, and has a data volume smaller than that of the image texture data. Therefore, an occupied display memory can be effectively reduced, and running performance of the display card can be improved. In addition, when the target image is required to be displayed, the display card is invoked to render the target image according to the target compressed texture data including each transcoded compressed texture block. In such a processing manner, data loaded from a storage space is the target compressed texture data of the target compressed texture format. Compared with loading decoded data, this manner has the advantage that the target compressed texture data is obtained by compression processing and has a smaller data volume, so that a problem of excessive bus bandwidth occupation during data loading can be solved. Further, a data format of each transcoded compressed texture block is the target compressed texture format adapted to the display card, so that when the display card is invoked to render the target image according to the target compressed texture data including each transcoded compressed texture block, image rendering efficiency is effectively improved, and image display timeliness is improved.

In some embodiments, for ease of performing the process shown in FIG. 2 and caching each transcoded compressed texture block obtained by transcoding, a storage space for caching the transcoded compressed texture block of the target compressed texture format is further added to the output display card shader cache block connected to the display card shader, and the following content is added to the input display card shader cache block:

a: a transcoding control parameter: the transcoding control parameter is mainly used for indicating whether each work group in the display card shader continues to transcode each piece of image texture data into a transcoded compressed texture block of the target compressed texture format after the plurality of pieces of image texture data are obtained by decoding and alignment;

b: a format parameter of the target compressed texture format, for example, the target compressed block size corresponding to the target compressed texture format, or an alignment size of each row of data; and c: the data alignment factor for compatibility with the unaligned source compressed texture data: the data alignment factor mainly indicates the quantity of source compressed texture blocks required to obtain one piece of image texture data by decoding. The input display card shader cache block includes the data alignment factor if the manner of first data alignment and then data decoding is used. The input display card shader cache block may not include the data alignment factor if the manner of first data decoding and then data alignment is used.

Figure 4A:
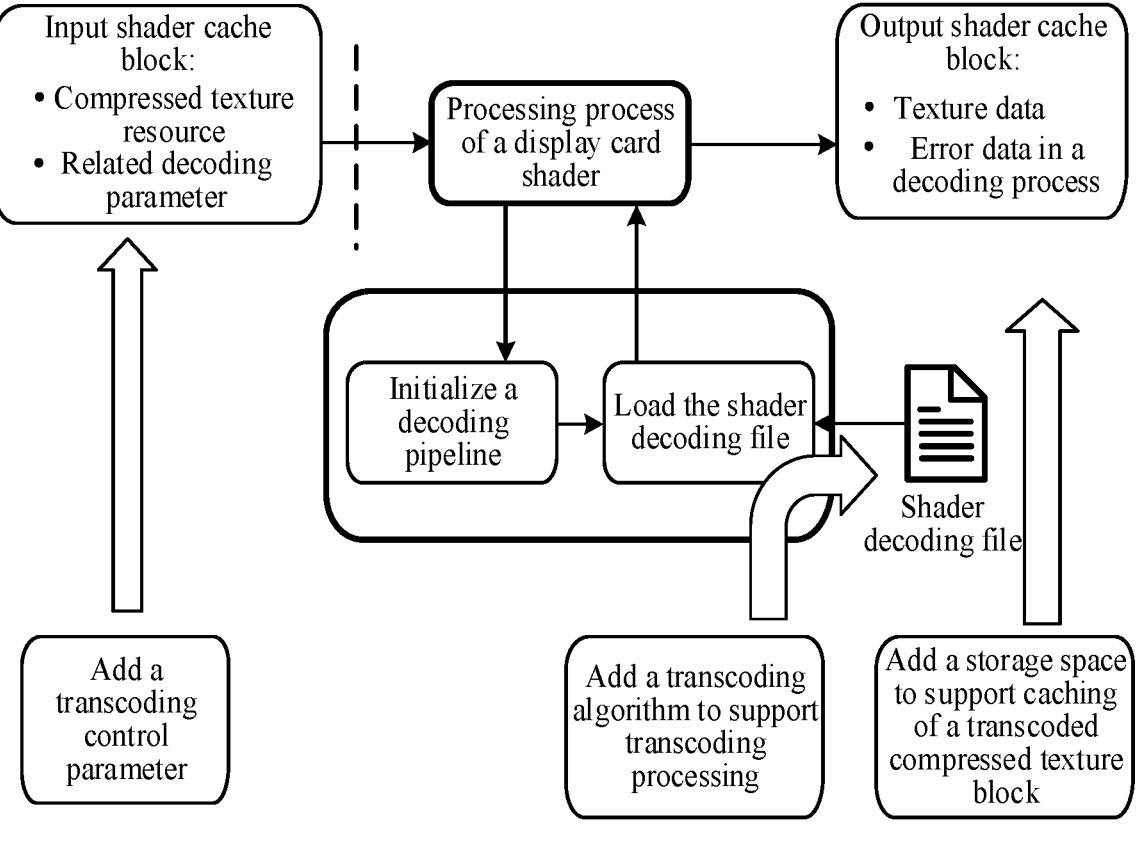
FIG. 4a is a schematic flowchart of performing an image processing method in a computer device according to an embodiment of the present disclosure.

Based on this, FIG. 4*a* shows an example of a general process of performing the image processing method shown in FIG. 2 in the computer device. As shown in FIG. 4*a*, the decoding pipeline in the computer device may be initialized first, and a shader decoding file is loaded. The shader decoding file not only includes a plurality of algorithm instructions for decoding compressed texture data of different compressed texture formats, but also is added with a transcoding algorithm for transcoding the texture format into the target compressed texture format. After the shader decoding file is successfully loaded, the shader decoding file may be transmitted to the display card shader of the computer device. Then, the target compressed texture data of the target compressed texture format may be obtained in any one of the following processing manners.

Figure 4B:
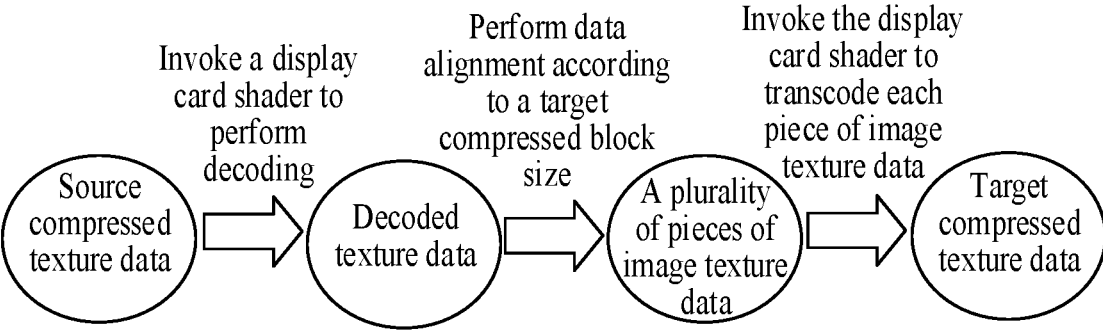
FIG. 4b is a schematic diagram of obtaining target compressed texture data by a computer device through a display card shader according to an embodiment of the present disclosure.

In the first processing manner, as shown in FIG. 4*b*, a related decoding parameter of the source compressed texture data and the source compressed texture data of the target image may be first input to the display card shader in the computer device by using the input display card shader cache block. The related decoding parameter of the source compressed texture data may be used for indicating the source compressed texture format for the target image. Then, the display card shader may decode the source compressed texture data into the decoded texture data of the texture format according to the related decoding parameter. Specifically, the display card shader allocates a target work group for decoding to each source compressed texture block in the source compressed texture data, and distribute each source compressed texture block to the corresponding target work group, and each target work group performs decoding processing in parallel on the corresponding compressed texture block according to the related decoding parameter, so as to obtain the decoded texture data of the target image. Any target work group performs decoding processing on the corresponding compressed texture block according to the related decoding parameter in a manner of first obtaining an algorithm instruction for decoding the source compressed texture block from the shader decoding file according to the related decoding parameter, and performing decoding processing on the corresponding source compressed texture block by using the obtained algorithm instruction to obtain decoded data corresponding to the corresponding source compressed texture block.

For example, the shader decoding file may include a first algorithm instruction for decoding compressed texture data of the ASTC format, and a second algorithm instruction for decoding compressed texture data of the ETC format. If the related decoding parameter of the source compressed texture data of the target image is used for indicating that the source compressed texture format for the target image is the ASTC compressed texture format for the target image is the ASTC format, the first algorithm instruction is obtained from the shader decoding file according to the related decoding parameter, and decoding processing is performed on the corresponding source compressed texture block by using the first algorithm instruction. If the related decoding parameter of the source compressed texture data of the target image is used for indicating that the source compressed texture format for the target image is the ETC format, the second algorithm instruction is obtained from the shader decoding file according to the related decoding parameter, and decoding processing is performed on the corresponding source compressed texture block by using the second algorithm instruction.

After obtaining decoded data, any target work group may cache the decoded data into the output shader cache block connected to the display card shader. After decoded data corresponding to each source compressed texture block is cached to the output shader cache block, the decoded texture data of the target image may be obtained. The decoded texture data may include the decoded data corresponding to each source compressed texture block. After obtaining the decoded texture data, the computer device may align the decoded texture data into the plurality of pieces of image texture data according to the target compressed block size. Then, the plurality of pieces of image texture data obtained by alignment are input to the display card shader in the computer device by using the input display card shader cache block, such that the display card shader transcodes each piece of image texture data into one or more transcoded compressed texture blocks of the target compressed texture format. A specific transcoding manner may refer to the related descriptions about operation S204 in the embodiments of the present disclosure, and will not be elaborated herein. Further, after obtaining any transcoded compressed texture block, the display card shader may calculate a shader cache block offset address corresponding to the any transcoded compressed texture block in the storage space, and then cache the any transcoded compressed texture block to a cache address indicated by the calculated shader cache block offset address. After all the transcoded compressed texture blocks are cached to the storage space, the target compressed texture data may be obtained.

Figure 4C:
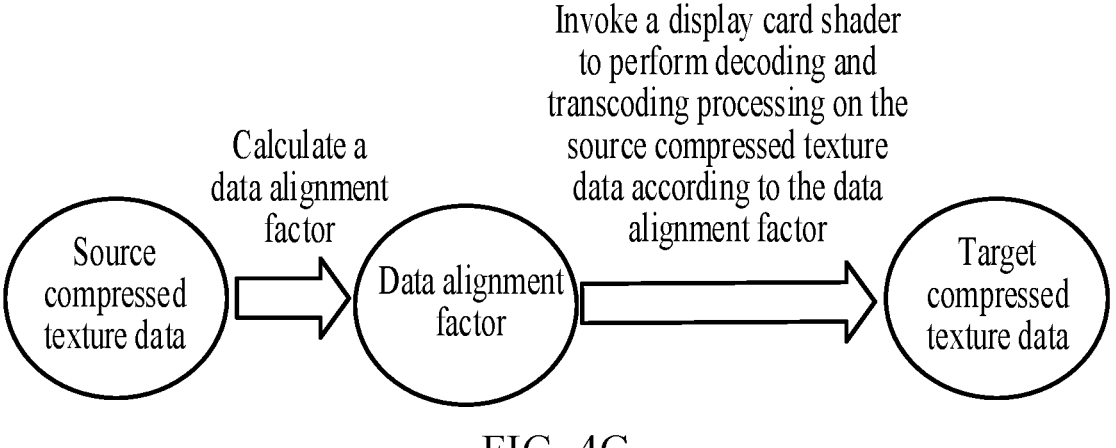
FIG. 4c is a schematic diagram of obtaining target compressed texture data by a computer device through a display card shader according to an embodiment of the present disclosure.

In the second processing manner, as shown in FIG. 4*c*, the computer device may first calculate the data alignment factor according to the target compressed block size and the source compressed block size. Then, the data alignment factor and the source compressed texture data of the target image may be input to the display card shader in the computer device by using the input display card shader cache block, such that the display card shader performs decoding and transcoding processing on the source compressed texture data according to the data alignment factor to obtain the target compressed texture data. Specifically, the display card shader may first divide the plurality of source compressed texture blocks into the plurality of texture block groups according to the data alignment factor, a quantity of source compressed texture blocks in one texture block group being consistent with the quantity indicated by the data alignment factor. Then, a processing work group is allocated, in the display card shader, to each texture block group, and each texture block group is distributed to the corresponding processing work group. Each processing work group decodes the corresponding texture block group into image texture data in parallel, and then performs transcoding processing on the corresponding image texture data to obtain a transcoded compressed texture block. Further, after obtaining any transcoded compressed texture block, the display card shader may calculate a shader cache block offset address corresponding to the any transcoded compressed texture block in the storage space, and then cache the any transcoded compressed texture block to a cache address indicated by the calculated shader cache block offset address. After all the transcoded compressed texture blocks are cached to the storage space, the target compressed texture data may be obtained.

In embodiments, if a decoding failure or transcoding failure occurs on the display card shader in a decoding or transcoding process, the display card shader may further output error data involved in the transcoding processing by using the output shader cache block, such that a related technical person timely analyzes a cause for the decoding failure or the transcoding failure according to the error data.

Figure 5A:
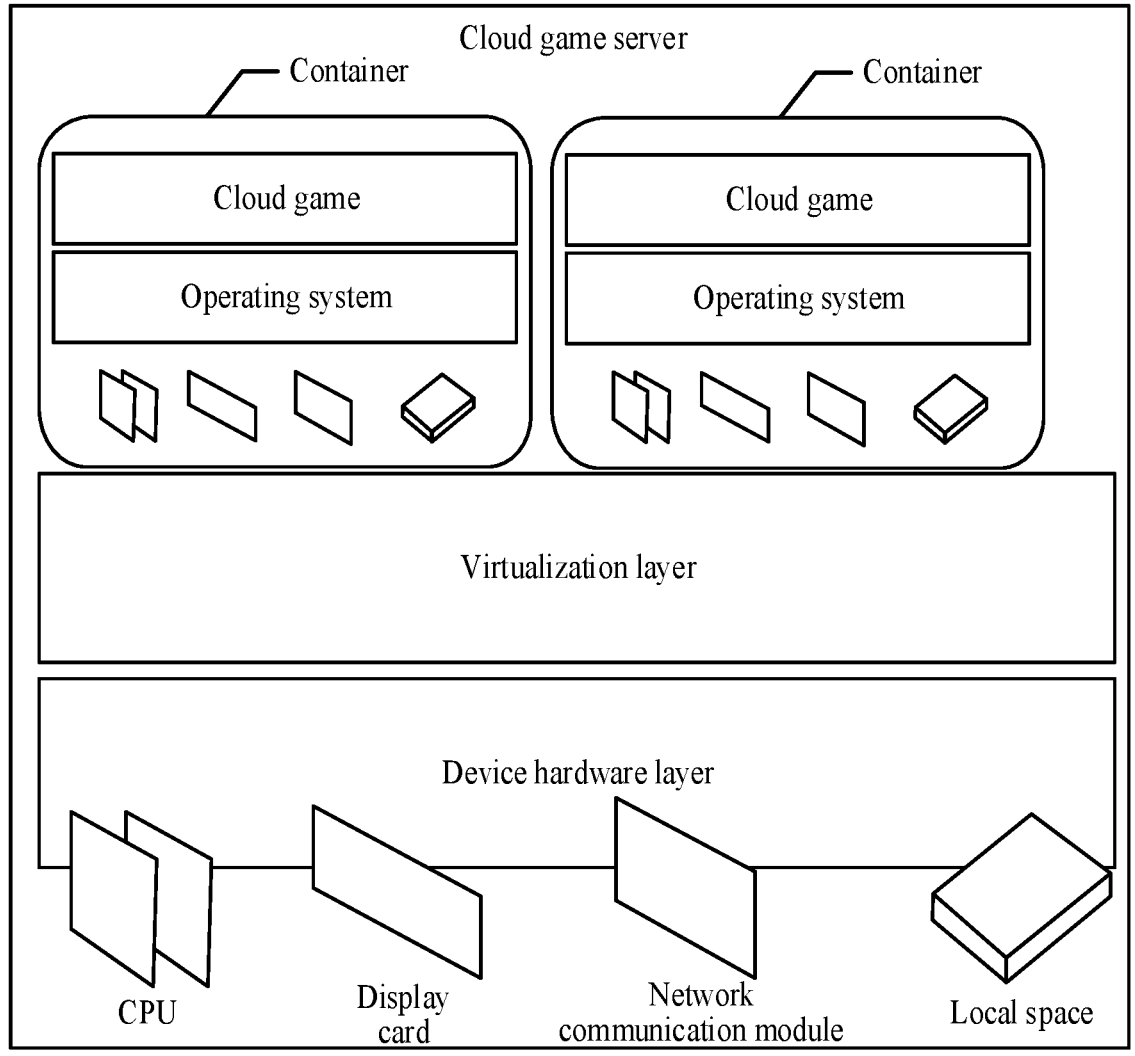
FIG. 5a is a schematic structural diagram of a cloud game server according to an embodiment of the present disclosure.

The image processing methods mentioned in the present disclosure may be applied to various application scenarios in which images need to be displayed, for example, a cloud game scene, a normal game scene, or a video playback scenario. When the image processing method is applied to the cloud game scene, the above-mentioned computer device may be a cloud game server that runs a cloud game. As shown in FIG. 5a, the cloud game server may include a device hardware layer, a virtualization layer (Hypervisor), one or more containers, and the like. The device hardware layer may include but is not limited to a central processing unit (CPU), a display card, a network communication module, a local space for storage, and the like. The display card may include but is not limited to a display card shader, a decoding pipeline, and a rendering pipeline. The display card shader works according to a process specified by the decoding pipeline. The virtualization layer is mainly configured to implement a set of virtual environment completely the same as a physical host environment in a software manner. The one or more containers of the cloud game server may be deployed and run through the virtualization layer. The container is a type of virtualization of an operating system level, and may be configured to bear an operating system. Each container may be connected to one or more game clients, and may be configured to run one or more cloud games. When running any cloud game, each container may transmit a game picture of the any cloud game to the connected game client for display.

Figure 5B:
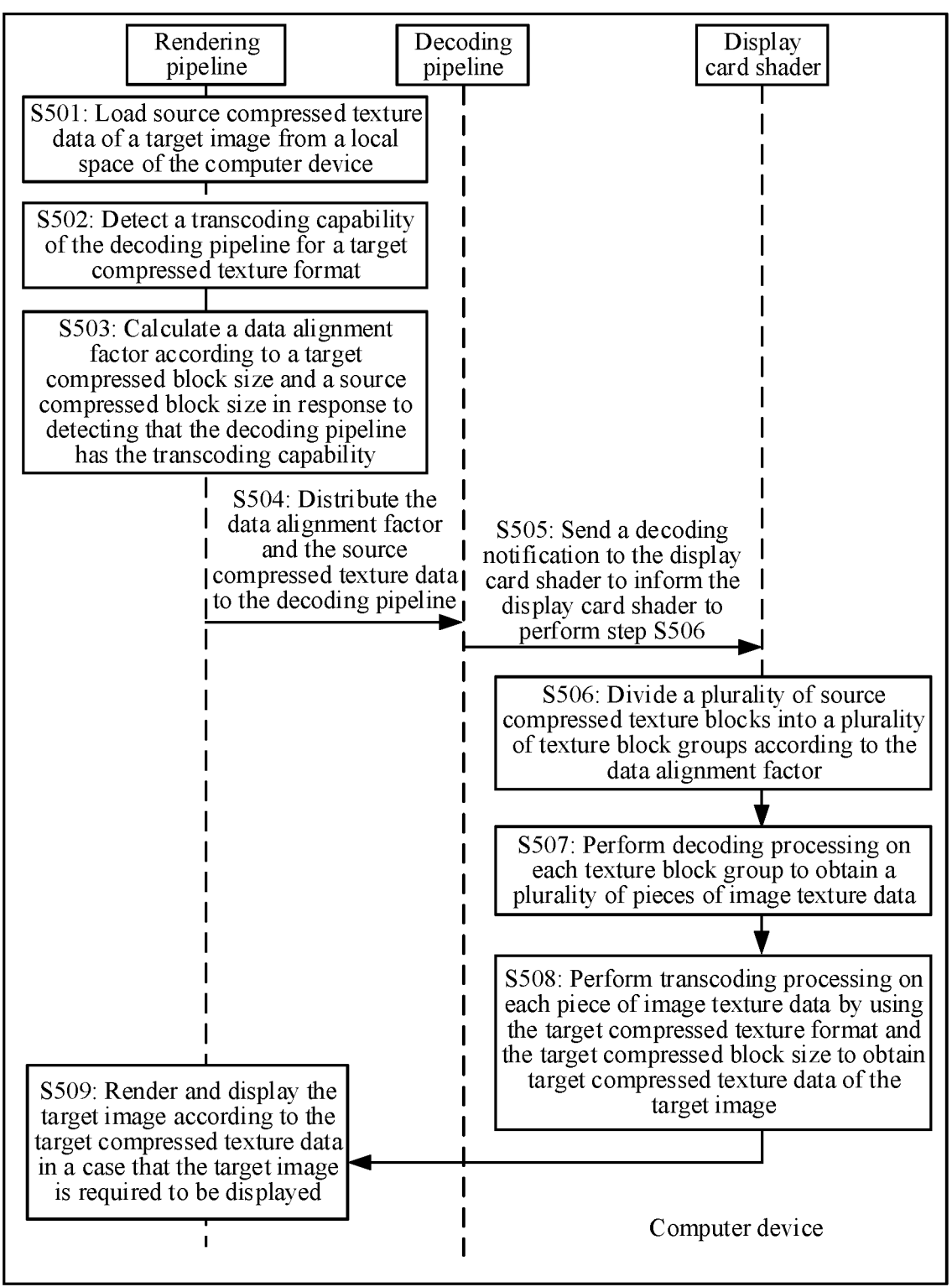
FIG. 5b is a flowchart illustrating a process for image processing according to another embodiment of the present disclosure.

The following takes application of the image processing method to the cloud game scene as an example. An embodiment further provides an image processing method shown in FIG. 5b. As shown in FIG. 5b, the image processing method may include the following operations S501 to S509.

S501: The rendering pipeline loads source compressed texture data of a target image from the local space of the computer device. The target image may be any game picture in a target cloud game.

S502: The rendering pipeline detects a transcoding capability of the decoding pipeline for a target compressed texture format.

Specifically, a transcoding function may be configured in advance for the computer device. The transcoding function includes two states: a function-on state and a function-off state. The function-on state is used for indicating that the decoding pipeline has the transcoding capability. The function-off state is used for indicating that the decoding pipeline does not have the transcoding capability. Based on this, when detecting the transcoding capability of the decoding pipeline for the target compressed texture format, the rendering pipeline may obtain a current function status of the transcoding function. If the current function status is the function-on state, it may be determined that the decoding pipeline is detected to have the transcoding capability; or if the current function status is the function-off state, it may be determined that the decoding pipeline is detected not to have the transcoding capability.

S503: The rendering pipeline calculates a data alignment factor according to a target compressed block size and a source compressed block size in response to detecting that the decoding pipeline has the transcoding capability.

S504: The rendering pipeline distributes the data alignment factor and the source compressed texture data to the decoding pipeline after calculating the data alignment factor.

S505: After successfully receiving the data alignment factor and the source compressed texture data, the decoding pipeline sends a decoding notification to the display card shader to inform the display card shader to perform operation S506 and continue to perform operations S507 and S508 after performing operation S506.

S506: The display card shader divides a plurality of source compressed texture blocks into a plurality of texture block groups according to the data alignment factor.

S507: The display card shader performs decoding processing on each texture block group to obtain a plurality of pieces of image texture data.

S508: The display card shader performs transcoding processing on each piece of image texture data by using the target compressed texture format and the target compressed block size to obtain target compressed texture data of the target image.

S509: The rendering pipeline renders the target image according to the target compressed texture data when the target image is required to be displayed.

A specific implementation of each operation involved in operations S503 to S509 may refer to the related descriptions about the method embodiment shown in FIG. 2, and will not be elaborated herein. For example, a specific implementation in which the rendering pipeline calculates the data alignment data according to the target compressed block size and the source compressed block size may refer to the related descriptions about operation S203. For another example, a specific implementation in which the display card shader divides the plurality of source compressed texture blocks into the plurality of texture block groups according to the data alignment factor and a specific implementation of performing decoding processing on each texture block group to obtain the plurality of pieces of image texture data may both refer to the related descriptions about operation S203.

In some embodiments, if the computer device has a display card decoding mode, the display card decoding mode being a mode in which decoding processing is performed by using the display card shader, the rendering pipeline may further detect a mode status of the display card decoding mode in response to detecting in operation S502 that the decoding pipeline does not have the transcoding capability, the mode status including a mode-on state or a mode-off state. When the mode status is the mode-on state, the rendering pipeline distributes the source compressed texture data to the decoding pipeline, and the decoding pipeline informs the display card shader to perform decoding processing on the source compressed texture data to obtain decoded texture data of the target image. In this case, the rendering pipeline may render the target image according to the decoded texture data in the case that the target image is required to be displayed. When the mode status is the mode-off state, the rendering pipeline may invoke the display card to drive the CPU to perform decoding processing on the source compressed texture data, and transcode decoded texture data obtained by decoding into the target compressed texture data. In this case, the rendering pipeline renders the target image according to the target compressed texture data in the case that the target image is required to be displayed.

Although descriptions are made in embodiments of the present disclosure by using an example in which the target image is any game picture in the target cloud game, in some embodiments, the image processing method shown in FIG. 5b is also applicable when the target image is another image (for example, a game picture in a normal game, a video image in any movie and television drama, a selfie image of any user, or a scenery image of any scenic spot).

In an embodiment of the present disclosure, source compressed texture data of any game picture in the target cloud game may be quickly transcoded into target compressed texture data of the target compressed texture format supported by the display card in the cloud game server by using high floating-point operation and parallel calculation capabilities of the display card (for example, AMD 5100 and NVIDA T4) in the cloud game server. Therefore, a problem of excessive display memory occupation and a problem of excessive bus bandwidth occupation during texture loading are solved, to improve display memory utilization of the cloud game server, and a problem of limited concurrent cloud game instances of the cloud game server caused by excessive display memory occupation is solved, to improve the display memory utilization of the cloud game server and reduce operational costs.

In order to further prove the beneficial effects of the image processing method provided in the embodiments of the

TABLE 1

| ETC2 | Solution 1 | Solution 2 | ASTC format | Solution 1 | Solution 2 |
|---|---|---|---|---|---|
| 256 × 256 | 0 ms | 0 ms | 256 × 256 | 1 ms | 1 ms |
| 512 × 512 | 1 ms | 0 ms | 512 × 512 | 2 ms | 2 ms |
| 1024 × 1024 | 3 ms | 3 ms | 1024 × 1024 | 5 ms | 6 ms |
| 2048 × 1024 | 7 ms | 7 ms | 2048 × 1024 | 9 ms | 10 ms |

Based on the statistical result shown in Table 1, it can be seen that compared with the solution 1, the solution 2 mentioned in the present disclosure has the advantage that there is no obvious impact on performance of the GPU in the display card of the cloud game server during concurrent processing of the display card shader.

Second, in the embodiments of the present disclosure, two sets of test configuration parameters are used in the same target cloud game to collect statistics on display memory occupations of the target cloud game after the existing solution 1 and the solution 2 of the present disclosure are used respectively. The two sets of test configuration parameters are respectively: (1) 1080×720, high definition (energy-saving frame rate, energy-saving resolution, high-definition picture quality); and (2) 1080×720, standard definition (energy-saving frame rate, energy-saving resolution, standard-definition picture quality). Under the two sets of test configuration parameters, a statistical result involved in the solution 1 and the solution 2 may specifically refer to the following Table 2.

TABLE 2

| Test configuration parameter | Solution 1 under standard definition | | Solution 2 under standard definition | | Solution 1 under high definition | | Solution 2 under high definition | |
|---|---|---|---|---|---|---|---|---|
| | Container | Game | Container | Game | Container | Game | Container | Game |
| Display memory occupation of the game | 600M | 501M | 440M | 339M | 1019M | 951M | 583M | 458M |
| Occupation of the texture data | | 296M | | 76M | | 747M | | 94M | present disclosure, in the embodiments of the present disclosure, the image processing manner (referred to as a solution 1 for short) mentioned in BACKGROUND OF THE DISCLOSURE and the image processing method (referred to as a solution 2) mentioned in the embodiments of the present disclosure are compared by testing in the cloud game scene.

First, source compressed texture data of an ETC2 format and source compressed texture data of the ASTC format respectively, which are of different sizes, are processed by using the solution 1 and the solution 2 respectively. Statistics on GPU occupation time of a GPU in the display card of the cloud game server in different cases is collected. A statistical result may specifically refer to the following Table 1.

Based on the statistical result shown in Table 2, it can be seen that compared with the solution 1, the solution 2 mentioned in the present disclosure has the advantage that a display memory overhead can be reduced by 32.3% ((501−339)/501×100%=32.3%) under the standard-definition picture quality, and can be reduced by 51.8% ((951−458)/951×100%=51.8%) under the high-definition picture quality.

In addition, in the embodiments of the present disclosure, the two sets of test configuration parameters are further used in a 5V5 battle scenario (five users versus five users) of the target cloud game to collect statistics on the display memory occupations of the target cloud game after the existing solution 1 and the solution 2 of the present disclosure are used respectively. A statistical result may specifically refer to the following Table 3.

TABLE 3

| 5V5 battle | Solution 1 under standard definition | | Solution 2 under standard definition | | Solution 1 under high definition | | Solution 2 under high definition | |
|---|---|---|---|---|---|---|---|---|
| scenario | Container | Game | Container | Game | Container | Game | Container | Game |
| Display memory occupation of the game | 678M | 566M | 478M | 356M | 1076M | 1006M | 613M | 501M |
| Occupation of the texture data | | 307M | | 73M | | 775M | | 200M |

Based on the statistical result shown in Table 3, it can be seen that in the 5V5 battle scenario, compared with the solution 1, the solution 2 mentioned in the present disclosure has the advantage that the display memory overhead can be reduced by 37.1% ((566−356)/566×100%=37.1%) under the standard-definition picture quality, and can be reduced by 50.1% ((1006−501)/1006×100%=50.1%) under the high-definition picture quality.

In summary, compared with the solution 1, the solution 2 mentioned in the present disclosure has the advantages that the display memory overhead can be effectively reduced, the display memory occupation can be obviously reduced, and the display memory utilization of the server can be improved while ensuring the fluency of the game, thereby improving game concurrency of the cloud game server. For example, for a cloud game server with a 10 G single-card display memory, when the solution 1 is used, the quantity of concurrent game paths of the target cloud game under the high-definition picture quality is limited to only 10 under the impact of the display memory. However, when the solution 2 provided in the present disclosure is used, the quantity of concurrent game paths may be increased to 20 because the display memory overhead is reduced.

Figure 6:
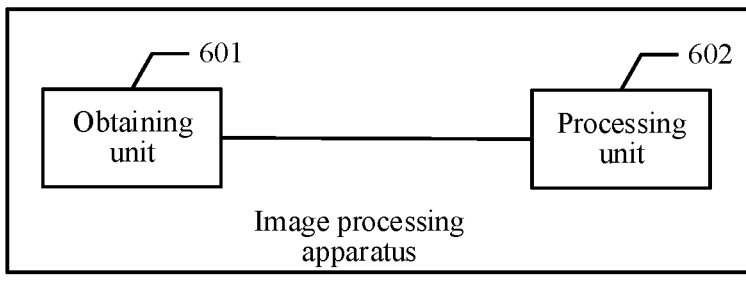
FIG. 6 is a schematic structural diagram of an image processing apparatus according to an embodiment of the present disclosure.

An embodiment of the present disclosure discloses an image processing apparatus. The image processing apparatus may be a computer program (including program code) running in a computer device. The image processing apparatus may perform the method shown in FIG. 2 or FIG. 5b. Referring to FIG. 6, the image processing apparatus may run the following units:

an obtaining unit 601, configured to obtain source compressed texture data of a target image, the source compressed texture data being obtained by encoding the target image by using a source compressed texture format; and a processing unit 602, configured to determine, when the source compressed texture format is incompatible with a display card, a target compressed texture format adapted to the display card and a target compressed block size corresponding to the target compressed texture format.

The processing unit 602 is further configured to perform decoding and alignment processing on the source compressed texture data based on the target compressed block size to obtain a plurality of pieces of image texture data, a data size of each piece of image texture data being an integer multiple of the target compressed block size.

The processing unit 602 is further configured to perform transcoding processing on each piece of image texture data by using the target compressed texture format and the target compressed block size to obtain target compressed texture data of the target image, the target compressed texture data including one or more transcoded compressed texture blocks corresponding to each piece of image texture data.

The processing unit 602 is further configured to invoke, when the target image is required to be displayed, the display card to render the target image according to the target compressed texture data.

In an implementation, the target compressed block size is X×Y, and XXY represents that X rows and Y columns of pixels are compressed into a block, X and Y being integers greater than 1. Accordingly, when configured to perform decoding and alignment processing on the source compressed texture data based on the target compressed block size to obtain a plurality of pieces of image texture data, the processing unit 602 may be further configured to:

perform decoding processing on the source compressed texture data to obtain decoded texture data of the target image, the decoded texture data including P rows and Q columns of pixels, and P and Q being integers greater than 1; and align the P rows and Q columns of pixels into a plurality of groups of pixels according to the target compressed block size, each group of pixels including X rows and Y columns of pixels, and decoded texture data of one group of pixels forming corresponding image texture data.

In an implementation, when configured to align the P rows and Q columns of pixels into a plurality of groups of pixels according to the target compressed block size, the processing unit 602 may be further configured to:

determine, in units of every X rows, X rows of current to-be-aligned pixels based on remaining rows of pixels on which alignment processing is not performed in the P rows of pixels;

perform alignment processing on the X rows of current to-be-aligned pixels according to an alignment frequency of one alignment for every Y column, to obtain N groups of pixels, N being a positive integer, and one group of pixels including X rows and Y columns of pixels; and pad, when there are K remaining columns of pixels in the X rows of current to-be-aligned pixels after alignment processing is performed on the X rows of current to-be-aligned pixels, 1≤K<Y, the K columns of pixels with Y-K columns of invalid pixels to obtain a group of pixels.

In an implementation, when configured to determine, in units of every X rows, X rows of current to-be-aligned pixels based on remaining rows of pixels on which alignment processing is not performed in the P rows of pixels, the processing unit 602 may be further configured to:

select, when a row quantity of the remaining rows of pixels on which alignment processing is not performed in the P rows of pixels is greater than or equal to X, the X rows of current to-be-aligned pixels from the remaining rows of pixels according to a selection sequence from top to bottom; or pad, when a row quantity of the remaining rows of pixels on which alignment processing is not performed in the P rows of pixels is less than X, the remaining rows of pixels with J rows of invalid pixels to obtain X rows of pixels, and determine the X rows of pixels obtained by padding as the X rows of current to-be-aligned pixels, a value of J being equal to a difference between X and the row quantity of the remaining rows of pixels.

In an implementation, when configured to perform transcoding processing on each piece of image texture data by using the target compressed texture format and the target compressed block size to obtain target compressed texture data of the target image, the processing unit 602 may be further configured to:

allocate, in a display card shader, a plurality of transcoding work groups for transcoding to the plurality of pieces of image texture data, one transcoding work group being allocated to one or more pieces of image texture data, and distribute each piece of image texture data to a corresponding transcoding work group; and invoke each transcoding work group in parallel to perform transcoding processing on the corresponding image texture data according to the target compressed texture format and the target compressed block size to obtain the target compressed texture data of the target image.

In an implementation, the source compressed texture data includes a plurality of source compressed texture blocks, and a size of each source compressed texture block is a source compressed block size corresponding to the source compressed texture format. Accordingly, when configured to perform decoding and alignment processing on the source compressed texture data based on the target compressed block size to obtain a plurality of pieces of image texture data, the processing unit 602 may be further configured to:

calculate a data alignment factor according to the target compressed block size and the source compressed block size, the data alignment factor indicating a quantity of source compressed texture blocks required to obtain one piece of image texture data by decoding;

divide the plurality of source compressed texture blocks into a plurality of texture block groups according to the data alignment factor, a quantity of source compressed texture blocks in one texture block group being consistent with the quantity indicated by the data alignment factor; and perform decoding processing on each texture block group to obtain the plurality of pieces of image texture data, one texture block group corresponding to one piece of image texture data.

In an implementation, the source compressed block size is A×B, and A×B represents that A rows and B columns of pixels are compressed into a block; and the target compressed block size is X×Y, and X×Y represents that X rows and Y columns of pixels are compressed into a block, A, B, X, and Y all being integers greater than 1. Accordingly, when configured to calculate a data alignment factor according to the target compressed block size and the source compressed block size, the processing unit 602 may be further configured to:

calculate a minimum common multiple between A and X as a first minimum common multiple, and determine a ratio of the first minimum common multiple to A as a row alignment factor;

calculate a minimum common multiple between B and Y as a second minimum common multiple, and determine a ratio of the second minimum common multiple to B as a column alignment factor; and perform a multiplication operation on the row alignment factor and the column alignment factor to obtain the data alignment factor.

In an implementation, when configured to calculate a data alignment factor according to the target compressed block size and the source compressed block size, the processing unit 602 may be further configured to:

determine a unit value as the data alignment factor when the target compressed block size is equal to the source compressed block size; or perform, when the target compressed block size is not equal to the source compressed block size, the operation of calculating a minimum common multiple between A and X as a first minimum common multiple.

In an implementation, when configured to perform decoding processing on each texture block group to obtain the plurality of pieces of image texture data, the processing unit 602 may be further configured to:

allocate, in a display card shader, a processing work group to each texture block group, each processing work group having at least a decoding capability;

distribute each texture block group to the corresponding processing work group; and invoke each processing work group in parallel to perform decoding processing on each source compressed texture block in the corresponding texture block group to obtain the plurality of pieces of image texture data.

In an implementation, each processing work group further has a transcoding capability. Accordingly, when configured to perform transcoding processing on each piece of image texture data by using the target compressed texture format and the target compressed block size to obtain target compressed texture data of the target image, the processing unit 602 may be further configured to:

continue to invoke, after any processing work group obtains a pieces of image texture data by decoding, the any processing work group to perform transcoding processing on the corresponding image texture data by using the target compressed texture format and the target compressed block size.

In an implementation, the display card is disposed in a computer device. The computer device further includes a rendering pipeline and a decoding pipeline. A display card shader in the display card works according to a process specified by the decoding pipeline. Accordingly, when configured to obtain source compressed texture data of a target image, the processing unit 601 may be further configured to:

load, by using the rendering pipeline, the source compressed texture data of the target image from a local space of the computer device.

Accordingly, the processing unit 602 may be further configured to:

detect, by using the rendering pipeline, a transcoding capability of the decoding pipeline for the target compressed texture format;

perform, by using the rendering pipeline in response to detecting that the decoding pipeline has the transcoding capability, the operation of calculating a data alignment factor according to the target compressed block size and the source compressed block size;

distribute, by using the rendering pipeline after calculat-
ing the data alignment factor, the data alignment factor
and the source compressed texture data to the decoding
pipeline; and transmit, by using the decoding pipeline after successfully
receiving the data alignment factor and the source
compressed texture data, a decoding notification to the
display card shader to inform the display card shader to
perform the operation of dividing the plurality of
source compressed texture blocks into a plurality of
texture block groups according to the data alignment
factor.

In an implementation, the computer device has a display
card decoding mode. The display card decoding mode is a
mode in which decoding processing is performed by using
the display card shader. Accordingly, the processing unit 602
may be further configured to:

detect, by using the rendering pipeline in response to
detecting that the decoding pipeline does not have the
transcoding capability, a mode status of the display card
decoding mode, the mode status including a mode-on
state or a mode-off state;

distribute, by using the rendering pipeline, the source
compressed texture data to the decoding pipeline when
the mode status is the mode-on state;

inform, by using the decoding pipeline, the display card
shader to perform decoding processing on the source
compressed texture data to obtain decoded texture data
of the target image; and render, by using the rendering pipeline, the target image
according to the decoded texture data when the target
image is required to be displayed.

In an implementation, the processing unit 602 may be
further configured to:

invoke, by using the rendering pipeline when the mode
status is the mode-off state, the display card to drive a
central processing unit to perform decoding processing
on the source compressed texture data, and transcode
decoded texture data obtained by decoding into the
target compressed texture data; and render, by using the rendering pipeline, the target image
according to the target compressed texture data when
the target image is required to be displayed.

According to an embodiment of the present disclosure,
each unit in the image processing apparatus shown in FIG.
6 may exist respectively or be combined into one or more
other units. Alternatively, a certain (or some) unit in the units
may be further split into multiple smaller function units,
thereby implementing the same operations without affecting
the technical effects of the embodiments of the present
disclosure. The units are divided based on logical functions.
In actual applications, a function of one unit may be realized
by multiple units, or functions of multiple units may be
realized by one unit. In an embodiment of the present
disclosure, the image processing apparatus may further
include other units. In actual applications, these functions
may alternatively be realized cooperatively by the other
units, and may be realized cooperatively by multiple units.

According to an embodiment of the present disclosure, a
computer program (including program code) capable of
performing each operation involved in the corresponding
method shown in FIG. 2 or FIG. 5*b* may be run in a
general-purpose computing device, for example, a com-
puter, including a processing element and a storage element,
for example, a CPU, a random access memory (RAM), or a
read-only memory (ROM), to structure the image processing
apparatus shown in FIG. 6 and implement the image processing method in the embodiments of the present disclo-
sure. The computer program may be recorded in, for
example, a computer-readable recording medium and
loaded, by using the computer-readable recording medium,
and run in the computing device.

In an embodiment of the present disclosure, after the
source compressed texture data of the target image is
obtained, decoding and alignment processing may be per-
formed on the source compressed texture data based on the
target compressed block size corresponding to the target
compressed texture format adapted to the display card to
obtain the plurality of pieces of image texture data. Decod-
ing and alignment processing may make the data size of each
piece of image texture data the integer multiple of the target
compressed block size. Then, each piece of image texture
data may be conveniently transcoded into one or more
transcoded compressed texture blocks for storage by using
the target compressed texture format and the target com-
pressed block size. The transcoded compressed texture
block obtained by transcoding is of a compressed texture
format, and has a data volume smaller than that of the image
texture data. Therefore, an occupied display memory can be
effectively reduced, and running performance of the display
card can be improved. In addition, when the target image is
required to be displayed, the display card is invoked to
render the target image according to the target compressed
texture data including each transcoded compressed texture
block. In such a processing manner, data loaded from a
storage space is the target compressed texture data of the
target compressed texture format. Compared with loading
decoded data, this manner has the advantage that the target
compressed texture data is obtained by compression pro-
cessing and has a smaller data volume, so that a problem of
excessive bus bandwidth occupation during data loading can
be solved. Further, a data format of each transcoded com-
pressed texture block is the target compressed texture format
adapted to the display card, so that when the display card is
invoked to render the target image according to the target
compressed texture data including each transcoded com-
pressed texture block, image rendering efficiency is effec-
tively improved, and image display timeliness is improved.

Figure 7:
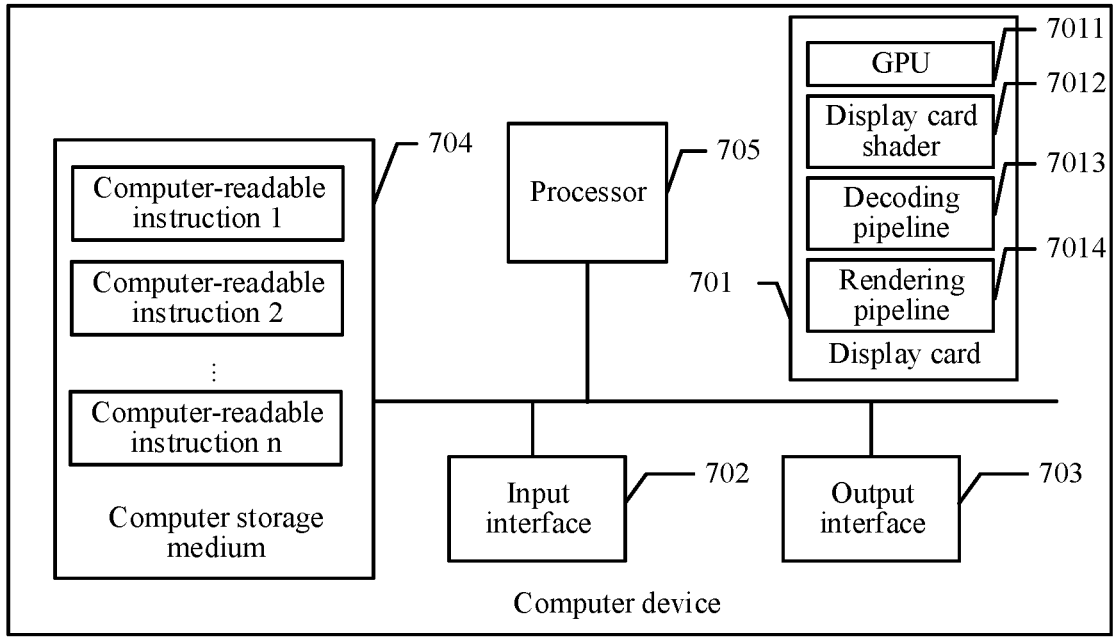
FIG. 7 is a schematic structural diagram of a computer device according to an embodiment of the present disclosure.

Based on the foregoing descriptions of the method
embodiment and the apparatus embodiment, an embodiment
of the present disclosure also provides a computer device.
Referring to FIG. 7, the computer device includes at least a
display card 701, an input interface 702, an output interface
703, and a computer storage medium 704. The display card
701, the input interface 702, the output interface 703, and the
computer storage medium 704 in the computer device may
be connected through a bus or in another manner. The
display card 701 may further include a GPU 7011, a display
card shader 7012, a decoding pipeline 7013, and a rendering
pipeline 7014. The computer storage medium 704 may be
stored in a memory of the computer device. The computer
storage medium 704 is configured to store computer-read-
able instructions. The processor 701 is configured to execute
the computer-readable instructions stored in the computer
storage medium 704. Further, the computer device may
further include a CPU 705. As a computing core and a
control core of the computer device, the CPU 705 is suitable
for implementing one or more computer-readable instruc-
tions, specifically suitable for loading and executing the one
or more computer-readable instructions, thereby implement-
ing corresponding method processes or corresponding func-
tions.

In an embodiment, the display card 701 may be config-
ured to perform a series of image processing, specifically including: obtaining source compressed texture data of a target image, the source compressed texture data being obtained by encoding the target image by using a source compressed texture format; determining, when the source compressed texture format is incompatible with the display card, a target compressed texture format adapted to the display card and a target compressed block size corresponding to the target compressed texture format; performing decoding and alignment processing on the source compressed texture data based on the target compressed block size to obtain a plurality of pieces of image texture data, a data size of each piece of image texture data being an integer multiple of the target compressed block size; performing transcoding processing on each piece of image texture data by using the target compressed texture format and the target compressed block size to obtain target compressed texture data of the target image, the target compressed texture data including one or more transcoded compressed texture blocks corresponding to each piece of image texture data; invoking, when the target image is required to be displayed, the display card to render the target image according to the target compressed texture data; and the like.

An embodiment of the present disclosure also provides a computer storage medium (memory). The computer storage medium is a memory device in a computer device, and is configured to store computer-readable instructions and data. It may be understood that the computer storage medium herein may include a built-in storage medium in the computer device, or may certainly include an extended storage medium supported by the computer device. The computer storage medium provides a storage space storing an operating system of the computer device. Moreover, one or more computer-readable instructions suitable for the display card 701 to load and execute are also stored in the storage space. These computer-readable instructions may be one or more computer programs (including program code). The computer storage medium herein may be a high-speed RAM, or a non-volatile memory, for example, at least one disk memory. In some embodiments, the computer storage medium may be at least one computer storage medium away from the processor.

In an embodiment, the display card 701 may load and execute the one or more computer-readable instructions stored in the computer storage medium, so as to implement the corresponding operations in the method of the image processing method embodiment shown in FIG. 2 or FIG. 5*b*. In a specific implementation, the one or more computer-readable instructions in the computer storage medium are loaded and executed by the display card 701 to implement the following operations:

obtaining source compressed texture data of a target image, the source compressed texture data being obtained by encoding the target image by using a source compressed texture format;

determining, when the source compressed texture format is incompatible with the display card, a target compressed texture format adapted to the display card and a target compressed block size corresponding to the target compressed texture format;

performing decoding and alignment processing on the source compressed texture data based on the target compressed block size to obtain a plurality of pieces of image texture data, a data size of each piece of image texture data being an integer multiple of the target compressed block size;

performing transcoding processing on each piece of image texture data by using the target compressed texture format and the target compressed block size to obtain target compressed texture data of the target image, the target compressed texture data including one or more transcoded compressed texture blocks corresponding to each piece of image texture data; and invoking, when the target image is required to be displayed, the display card to render the target image according to the target compressed texture data.

In an implementation, the target compressed block size is X×Y, and X×Y represents that X rows and Y columns of pixels are compressed into a block. X and Y being integers greater than 1. Accordingly, when decoding and alignment processing is performed on the source compressed texture data based on the target compressed block size to obtain the plurality of pieces of image texture data, the one or more instructions are loaded and executed by the display card 701 to:

perform decoding processing on the source compressed texture data to obtain decoded texture data of the target image, the decoded texture data including P rows and Q columns of pixels, and P and Q being integers greater than 1; and align the P rows and Q columns of pixels into a plurality of groups of pixels according to the target compressed block size, each group of pixels including X rows and Y columns of pixels, and decoded texture data of one group of pixels forming corresponding image texture data.

In an implementation, when the P rows and Q columns of pixels are aligned into the plurality of groups of pixels according to the target compressed block size, the one or more instructions are loaded and executed by the display card 701 to:

determine, in units of every X rows, X rows of current to-be-aligned pixels based on remaining rows of pixels on which alignment processing is not performed in the P rows of pixels;

perform alignment processing on the X rows of current to-be-aligned pixels according to an alignment frequency of one alignment for every Y column, to obtain N groups of pixels, N being a positive integer, and one group of pixels including X rows and Y columns of pixels; and pad, when there are K remaining columns of pixels in the X rows of current to-be-aligned pixels after alignment processing is performed on the X rows of current to-be-aligned pixels, 1≤K<Y, the K columns of pixels with Y-K columns of invalid pixels to obtain a group of pixels.

In an implementation, when the X rows of current to-be-aligned pixels are determined in units of every X rows based on the remaining rows of pixels on which alignment processing is not performed in the P rows of pixels, the one or more instructions are loaded and executed by the display card 701 to:

select, when a row quantity of the remaining rows of pixels on which alignment processing is not performed in the P rows of pixels is greater than or equal to X, the X rows of current to-be-aligned pixels from the remaining rows of pixels according to a selection sequence from top to bottom; or pad, when a row quantity of the remaining rows of pixels on which alignment processing is not performed in the P rows of pixels is less than X, the remaining rows of pixels with J rows of invalid pixels to obtain X rows of pixels, and determine the X rows of pixels obtained by padding as the X rows of current to-be-aligned pixels, a value of J being equal to a difference between X and the row quantity of the remaining rows of pixels.

In an implementation, when transcoding processing is performed on each piece of image texture data by using the target compressed texture format and the target compressed block size to obtain the target compressed texture data of the target image, the one or more instructions are loaded and executed by the display card 701 to:

allocate, in a display card shader, a plurality of transcoding work groups for transcoding to the plurality of pieces of image texture data, one transcoding work group being allocated to one or more pieces of image texture data, and distribute each piece of image texture data to a corresponding transcoding work group; and invoke each transcoding work group in parallel to perform transcoding processing on the corresponding image texture data according to the target compressed texture format and the target compressed block size to obtain the target compressed texture data of the target image.

In an implementation, the source compressed texture data includes a plurality of source compressed texture blocks, and a size of each source compressed texture block is a source compressed block size corresponding to the source compressed texture format. Accordingly, when decoding and alignment processing is performed on the source compressed texture data based on the target compressed block size to obtain the plurality of pieces of image texture data, the one or more instructions are loaded and executed by the display card 701 to:

calculate a data alignment factor according to the target compressed block size and the source compressed block size, the data alignment factor indicating a quantity of source compressed texture blocks required to obtain one piece of image texture data by decoding;

divide the plurality of source compressed texture blocks into a plurality of texture block groups according to the data alignment factor, a quantity of source compressed texture blocks in one texture block group being consistent with the quantity indicated by the data alignment factor; and perform decoding processing on each texture block group to obtain the plurality of pieces of image texture data, one texture block group corresponding to one piece of image texture data.

In an implementation, the source compressed block size is A×B, and A×B represents that A rows and B columns of pixels are compressed into a block; and the target compressed block size is X×Y, and X×Y represents that X rows and Y columns of pixels are compressed into a block, A, B, X, and Y all being integers greater than 1. Accordingly, when the data alignment factor is calculated according to the target compressed block size and the source compressed block size, the one or more instructions are loaded and executed by the display card 701 to:

calculate a minimum common multiple between A and X as a first minimum common multiple, and determine a ratio of the first minimum common multiple to A as a row alignment factor;

calculate a minimum common multiple between B and Y as a second minimum common multiple, and determine a ratio of the second minimum common multiple to B as a column alignment factor; and perform a multiplication operation on the row alignment factor and the column alignment factor to obtain the data alignment factor.

In an implementation, when the data alignment factor is calculated according to the target compressed block size and the source compressed block size, the one or more instructions may be further loaded and executed by the display card 701 to:

determine a unit value as the data alignment factor when the target compressed block size is equal to the source compressed block size; or perform, when the target compressed block size is not equal to the source compressed block size, the operation of calculating a minimum common multiple between A and X as a first minimum common multiple.

In an implementation, when decoding processing is performed on each texture block group to obtain the plurality of pieces of image texture data, the one or more instructions are loaded and executed by the display card 701 to:

allocate, in a display card shader, a processing work group to each texture block group, each processing work group having at least a decoding capability;

distribute each texture block group to the corresponding processing work group; and invoke each processing work group in parallel to perform decoding processing on each source compressed texture block in the corresponding texture block group to obtain the plurality of pieces of image texture data.

In an implementation, each processing work group further has a transcoding capability. Accordingly, when transcoding processing is performed on each piece of image texture data by using the target compressed texture format and the target compressed block size to obtain the target compressed texture data of the target image, the one or more instructions are loaded and executed by the display card 701 to:

continue to invoke, after any processing work group obtains a pieces of image texture data by decoding, the any processing work group to perform transcoding processing on the corresponding image texture data by using the target compressed texture format and the target compressed block size to obtain the target compressed texture data of the target image.

In an implementation, the display card is disposed in the computer device. The computer device further includes a rendering pipeline and a decoding pipeline. A display card shader in the display card works according to a process specified by the decoding pipeline. Accordingly, when the source compressed texture data of the target image is obtained, the one or more instructions are loaded and executed by the display card 701 to: load, by using the rendering pipeline, the source compressed texture data of the target image from a local space of the computer device.

Accordingly, the one or more instructions may be further loaded and executed by the display card 701 to:

detect, by using the rendering pipeline, a transcoding capability of the decoding pipeline for the target compressed texture format;

perform, by using the rendering pipeline in response to detecting that the decoding pipeline has the transcoding capability, the operation of calculating a data alignment factor according to the target compressed block size and the source compressed block size;

distribute, by using the rendering pipeline after calculating the data alignment factor, the data alignment factor and the source compressed texture data to the decoding pipeline; and transmit, by using the decoding pipeline after successfully receiving the data alignment factor and the source compressed texture data, a decoding notification to the display card shader to inform the display card shader to perform the operation of dividing the plurality of source compressed texture blocks into a plurality of texture block groups according to the data alignment factor.

In an implementation, the computer device has a display card decoding mode. The display card decoding mode is a mode in which decoding processing is performed by using the display card shader. Accordingly, the one or more instructions may be further loaded and executed by the display card 701 to:

detect, by using the rendering pipeline in response to detecting that the decoding pipeline does not have the transcoding capability, a mode status of the display card decoding mode, the mode status including a mode-on state or a mode-off state;

distribute, by using the rendering pipeline, the source compressed texture data to the decoding pipeline when the mode status is the mode-on state;

inform, by using the decoding pipeline, the display card shader to perform decoding processing on the source compressed texture data to obtain decoded texture data of the target image; and render, by using the rendering pipeline, the target image according to the decoded texture data when the target image is required to be displayed.

In an implementation, the one or more instructions may be further loaded and executed by the display card 701 to:

invoke, by using the rendering pipeline when the mode status is the mode-off state, the display card to drive a central processing unit to perform decoding processing on the source compressed texture data, and transcode decoded texture data obtained by decoding into the target compressed texture data; and render, by using the rendering pipeline, the target image according to the target compressed texture data when the target image is required to be displayed.

In this embodiment of the present disclosure, after the source compressed texture data of the target image is obtained, decoding and alignment processing may be performed on the source compressed texture data based on the target compressed block size corresponding to the target compressed texture format adapted to the display card to obtain the plurality of pieces of image texture data. Decoding and alignment processing may make the data size of each piece of image texture data the integer multiple of the target compressed block size. Then, each piece of image texture data may be conveniently transcoded into one or more transcoded compressed texture blocks for storage by using the target compressed texture format and the target compressed block size. Therefore, an occupied display memory can be effectively reduced, and running performance of the display card can be improved. In addition, when the target image is required to be displayed, the display card is invoked to render the target image according to the target compressed texture data including each transcoded compressed texture block. In such a processing manner, data loaded from a storage space is the target compressed texture data. Compared with loading decoded data, this manner has the advantage that a data volume of the target compressed texture data is smaller, so that a problem of excessive bus bandwidth occupation during data loading can be solved. Further, a data format of each transcoded compressed texture block is the target compressed texture format adapted to the display card, so that when the display card is invoked to render the target image according to the target compressed texture data including each transcoded compressed texture block, image rendering efficiency is effectively improved, and image display timeliness is improved.

According to an aspect of the present disclosure, a computer-readable instruction product is provided. The computer-readable instruction product includes computer-readable instructions. The computer-readable instructions are stored in a computer-readable storage medium. A processor of a computer device reads the computer-readable instructions from the computer-readable storage medium. The processor executes the computer-readable instructions to enable the computer device to perform the method provided in various optional modes in the image processing method embodiment shown in FIG. 2 or FIG. 5b.

Moreover, it is to be understood that the above is only the preferred embodiment of the present disclosure and certainly not intended to limit the scope of the present disclosure. Therefore, equivalent variations made according to the claims of the present disclosure also fall within the scope of the present disclosure.

What is claimed is:

1. A method for image processing, the method being performed by at least one processor of a computer device, and the method comprising:

obtaining source compressed texture data of a target image, by encoding the target image by using a source compressed texture format;

determining, based on the source compressed texture format being incompatible with a display card of the computer device, a target compressed texture format adapted to the display card and a target compressed block size corresponding to the target compressed texture format, wherein the target compressed block size is a first width and a first height;

obtaining a plurality of pieces of image texture data, based on decoding and aligning the source compressed texture data by using the target compressed block size, a data size of each piece of the plurality of pieces of image texture data being an integer multiple of the target compressed block size, wherein the decoding the source compressed texture data comprises obtaining decoded texture data of the target image, the decoded texture data comprising a second width and a second height, and wherein the aligning the source compressed texture data comprises:

aligning a first width of rows of the current to-be-aligned pixels based on an alignment frequency of one alignment for columns of every first height, to obtain a first number of groups of pixels, the first number of the groups of pixels being a positive integer, and at least one group of the first number of the groups of pixels comprising the first width and the second width of pixels, and padding a second number of remaining columns of pixels with a third number of columns of invalid pixels to obtain a group of pixels among a plurality of groups of pixels, based on the second number of remaining columns of pixels being remaining columns of pixels in the first width of rows of the current to-be-aligned pixels after aligning the first width of rows, and wherein the second number of remaining columns of pixels is greater than or equal to one and less than the first width;

obtaining target compressed texture data of the target image, based on transcoding each piece of the plurality of pieces of image texture data by using the target compressed texture format and the target compressed block size, the target compressed texture data comprising one or more transcoded compressed texture blocks corresponding to each piece of the plurality of pieces of image texture data; and rendering the target image based on the target compressed texture data.

2. The method according to claim 1, wherein the first width and the first height being greater than 1, wherein and the second width and the second height being greater than 1, and wherein obtaining the plurality of pieces of image texture data comprises:

aligning the decoded texture data into the plurality of groups of pixels based on the target compressed block size, each group of pixels being of the first width and the first height, and the decoded texture data of one group of pixels forming corresponding image texture data.

3. The method according to claim 2, wherein the aligning the decoded texture data further comprises:

determining, for every first width of rows, the first width of rows of current to-be-aligned pixels based on remaining rows of pixels on which alignment is not performed in the second width of pixels.

4. The method according to claim 3, wherein the determining comprises:

selecting the first width of rows of the current to-be-aligned pixels from the remaining rows of pixels based on a selection sequence from top to bottom when a row quantity of the remaining rows of pixels on which alignment is not performed in the second width of rows of pixels is greater than or equal to the first width; or padding the remaining rows of pixels with a fourth number of rows of invalid pixels to obtain a first width of rows of pixels, and determining the first width of rows of pixels obtained by padding as the first width of rows of the current to-be-aligned pixels when the row quantity of the remaining rows of pixels on which alignment is not performed in the second width of rows of pixels is less than the first width, the fourth number of rows being equal to a difference between the first width and the row quantity of the remaining rows of pixels.

5. The method according to claim 1, wherein the transcoding comprises:

allocating in a display card shader, a plurality of transcoding work groups for transcoding each piece of the plurality of pieces of image texture data, one transcoding work group among the plurality of transcoding work groups being allocated to one or more pieces of image texture data, and distributing each piece of the plurality of pieces of image texture data to a corresponding transcoding work group; and obtaining the target compressed texture data of the target image based on one or more transcoding work groups among the plurality of transcoding work groups transcoding the one or more pieces of image texture data in parallel according to the target compressed texture format and the target compressed block size.

6. The method according to claim 1, wherein the source compressed texture data comprises a plurality of source compressed texture blocks, a size of each source compressed texture block is a source compressed block size corresponding to the source compressed texture format, and wherein the decoding and aligning the source compressed texture data comprises:

calculating a data alignment factor according to the target compressed block size and the source compressed block size, the data alignment factor indicating a quantity of source compressed texture blocks required to obtain one piece of the image texture data by decoding;

dividing the plurality of source compressed texture blocks into a plurality of texture block groups based on the data alignment factor, the quantity of source compressed texture blocks in one texture block group being consistent with the quantity indicated by the data alignment factor; and decoding each texture block group to obtain the plurality of pieces of image texture data, one texture block group corresponding to one piece of the image texture data.

7. The method according to claim 6, wherein the source compressed block size is a third width and a third height, the third width and the third height being greater than 1, the target compressed block size is a first width and a first height, the first width and the first height being greater than 1, and calculating the data alignment factor comprises:

calculating a minimum common multiple between the third width and the first width as a first minimum common multiple, and determining a ratio of the first minimum common multiple to the third width as a row alignment factor;

calculating a minimum common multiple between the third height and the first height as a second minimum common multiple, and determining a ratio of the second minimum common multiple to the third height as a column alignment factor; and obtaining the data alignment factor by performing a multiplication operation on the row alignment factor and the column alignment factor.

8. The method according to claim 7, wherein the calculating the data alignment factor further comprises:

determining a unit value as the data alignment factor based on the target compressed block size being equal to the source compressed block size; or calculating the minimum common multiple between the third width and the first width as the first minimum common multiple based on the target compressed block size not being equal to the source compressed block size.

9. The method according to claim 6, wherein decoding each texture block group comprises:

allocating, in a display card shader, a processing work group to each texture block group, each processing work group having at least a decoding capability;

distributing each texture block group to the processing work group corresponding to each texture block; and obtaining the plurality of pieces of image texture data based on decoding each source compressed texture block in a corresponding texture block group, wherein the decoding is performed in parallel by each processing work group.

10. The method according to claim 9, wherein each processing work group further has a transcoding capability, and transcoding each piece of the plurality of pieces of image texture data comprises:

subsequent to obtaining the plurality of pieces of image texture data based on decoding, obtaining the target compressed texture data of the target image by transcoding the plurality of pieces of image texture data by each processing work group based on the target compressed texture format and the target compressed block size.

11. The method according to claim 6, wherein the rendering comprises rendering using the display card of the computer device, wherein the computer device further comprises a rendering pipeline and a decoding pipeline, and wherein a display card shader in the display card is configured to perform based on one or more instructions from the decoding pipeline, and obtaining the source compressed texture data of the target image comprises loading, by the rendering pipeline, the source compressed texture data of the target image from a local space of the computer device; and the method further comprises:

detecting, by the rendering pipeline, a transcoding capability of the decoding pipeline for the target compressed texture format;

calculating, by the rendering pipeline in response to detecting that the decoding pipeline has the transcoding capability, the data alignment factor according to the target compressed block size and the source compressed block size;

subsequent to calculating the data alignment factor, distributing, by the rendering pipeline, the data alignment factor and the source compressed texture data to the decoding pipeline; and based on receiving the data alignment factor and the source compressed texture data, transmitting, by the decoding pipeline, a decoding notification to the display card shader to divide the plurality of source compressed texture blocks into the plurality of texture block groups according to the data alignment factor.

12. The method according to claim 11, wherein the display card has a decoding mode, the decoding mode being a mode in which the display card shader performs decoding, and the method further comprises:

detecting, by the rendering pipeline in response to detecting that the decoding pipeline does not have the transcoding capability, a mode status of the decoding mode, the mode status comprising a mode-on state or a mode-off state;

based on the mode status being in the mode-on state, distributing, by the rendering pipeline, the source compressed texture data to the decoding pipeline;

based on the mode status being in the mode-off state, transmitting, by the decoding pipeline, instructions to decode the source compressed texture data to obtain decoded texture data of the target image; and rendering, by the rendering pipeline, the target image according to the decoded texture data in a case that the target image is required to be displayed.

13. The method according to claim 12, wherein the method is performed by at least two processors, and one of the at least two processors is a graphics processor, and wherein the method further comprises:

based on the mode status being in the mode-off state, decoding processing on the source compressed texture data and transcoding the decoded texture data into the target compressed texture data, wherein the decoding and transcoding is performed by the graphics processor; and rendering, by the rendering pipeline, the target image according to the target compressed texture data.

14. An image processing apparatus, the apparatus comprising:

at least one memory configured to store computer program code; and at least one processor configured to access the computer program code and operate as instructed by the computer program code, the computer program code including:

first obtaining code configured to cause the at least one processor to obtain source compressed texture data of a target image, by using a source compressed texture format;

first determining code configured to cause the at least one processor to determine, based on the source compressed texture format being incompatible with a display card, a target compressed texture format adapted to the display card and a target compressed block size corresponding to the target compressed texture format, wherein the target compressed block size is a first width and a first height;

second obtaining code configured to cause the at least one processor to obtain a plurality of pieces of image texture data based on decoding and aligning the source compressed texture data by using the target compressed block size, a data size of each piece of the plurality of pieces of image texture data being an integer multiple of the target compressed block size, wherein the decoding the source compressed texture data comprises obtaining decoded texture data of the target image, the decoded texture data comprising a second width and a second height, and wherein the aligning the source compressed texture data comprises:

aligning a first width of rows of the current to-be-aligned pixels based on an alignment frequency of one alignment for columns of every first height, to obtain a first number of groups of pixels, the first number of the groups of pixels being a positive integer, and at least one group of the first number of the groups of pixels comprising the first width and the second width of pixels, and padding a second number of remaining columns of pixels with a third number of columns of invalid pixels to obtain a group of pixels among a plurality of groups of pixels, based on the second number of remaining columns of pixels being remaining columns of pixels in the first width of rows of the current to-be-aligned pixels after aligning the first width of rows, and wherein the second number of remaining columns of pixels is greater than or equal to one and less than the first width;

third obtaining code configured to cause the at least one processor to obtain target compressed texture data of the target image based on transcoding each piece of the plurality of pieces of image texture data by using the target compressed texture format and the target compressed block size, the target compressed texture data comprising one or more transcoded compressed texture blocks corresponding to each piece of the plurality of pieces of image texture data; and first rendering code configured to cause the at least one processor to render the target image based on the target compressed texture data.

15. The apparatus according to claim 14, wherein the first width and the first height being greater than 1, wherein and the second width and the second height being greater than 1, and wherein the second obtaining code comprises:

first aligning code configured to cause the at least one processor to align the decoded texture data into a plurality of groups of pixels based on the target compressed block size, each group of pixels being of the first width and the first height, and the decoded texture data of one group of pixels forming corresponding image texture data.

16. The apparatus according to claim 15, wherein the first aligning code further comprises:

second determining code configured to cause the at least one processor to determine, for every first width of rows, the first width of rows of current to-be-aligned pixels based on remaining rows of pixels on which alignment is not performed in the second width of pixels.

17. The apparatus according to claim 16, wherein the second determining code comprises:

first selecting code configured to cause the at least one processor to select the first width of rows of the current to-be-aligned pixels from the remaining rows of pixels based on a selection sequence from top to bottom when a row quantity of the remaining rows of pixels on which alignment is not performed in the second width of rows of pixels is greater than or equal to the first width; or second padding code configured to cause the at least one processor to pad the remaining rows of pixels with a fourth number of rows of invalid pixels to obtain a first width of rows of pixels, and determining the first width of rows of pixels obtained by padding as the first width of rows of the current to-be-aligned pixels when the row quantity of the remaining rows of pixels on which alignment is not performed in the second width of rows of pixels is less than the first width, the fourth number of rows being equal to a difference between the first width and the row quantity of the remaining rows of pixels.

18. The apparatus according to claim 14, wherein the source compressed texture data comprises a plurality of source compressed texture blocks, a size of each source compressed texture block is a source compressed block size corresponding to the source compressed texture format, and the second obtaining code comprises:

first calculating code configured to cause the at least one processor to calculate a data alignment factor according to the target compressed block size and the source compressed block size, the data alignment factor indicating a quantity of source compressed texture blocks required to obtain one piece of the image texture data by decoding;

first dividing code configured to cause the at least one processor to divide the plurality of source compressed texture blocks into a plurality of texture block groups based on the data alignment factor, the quantity of source compressed texture blocks in one texture block group being consistent with the quantity indicated by the data alignment factor; and first decoding code configured to cause the at least one processor to decode each texture block group to obtain the plurality of pieces of image texture data, one texture block group corresponding to one piece of the image texture data.

19. A non-transitory computer-readable medium storing instructions, the instructions comprising: one or more instructions that, when executed by one or more processors of a device for image processing, cause the one or more processors to:

obtain source compressed texture data of a target image, by using a source compressed texture format;

determine, based on the source compressed texture format being incompatible with a display card, a target compressed texture format adapted to the display card and a target compressed block size corresponding to the target compressed texture format, wherein the target compressed block size is a first width and a first height;

obtain a plurality of pieces of image texture data based on decoding and aligning the source compressed texture data by using the target compressed block size, a data size of each piece of the plurality of pieces of image texture data being an integer multiple of the target compressed block size, wherein the decoding the source compressed texture data comprises obtaining decoded texture data of the target image, the decoded texture data comprising a second width and a second height, and wherein the aligning the source compressed texture data comprises:

aligning a first width of rows of the current to-be-aligned pixels based on an alignment frequency of one alignment for columns of every first height, to obtain a first number of groups of pixels, the first number of the groups of pixels being a positive integer, and at least one group of the first number of the groups of pixels comprising the first width and the second width of pixels, and padding a second number of remaining columns of pixels with a third number of columns of invalid pixels to obtain a group of pixels among a plurality of groups of pixels, based on the second number of remaining columns of pixels being remaining columns of pixels in the first width of rows of the current to-be-aligned pixels after aligning the first width of rows, and wherein the second number of remaining columns of pixels is greater than or equal to one and less than the first width;

obtain target compressed texture data of the target image based on transcoding each piece of the plurality of pieces of image texture data by using the target compressed texture format and the target compressed block size, the target compressed texture data comprising one or more transcoded compressed texture blocks corresponding to each piece of the plurality of pieces of image texture data; and render the target image based on the target compressed texture data.

20. The non-transitory computer-readable medium of claim 19, wherein the first width and the first height being greater than 1, wherein and the second width and the second height being greater than 1, and wherein obtaining the plurality of pieces of image texture data comprises:

aligning the decoded texture data into the plurality of groups of pixels based on the target compressed block size, each group of pixels being of the first width and the first height, and the decoded texture data of one group of pixels forming corresponding image texture data.

\* \* \* \* \*